(12) United States Patent
Zhang et al.

(10) Patent No.: US 11,102,744 B2
(45) Date of Patent: *Aug. 24, 2021

(54) DOWNLINK SYNCHRONIZATION METHOD, AND APPARATUS AND SYSTEM CROSS-REFERENCE TO RELATED APPLICATIONS

(71) Applicant: HUAWEI TECHNOLOGIES CO., LTD., Guangdong (CN)

(72) Inventors: Jian Zhang, Shanghai (CN); Yuanjie Li, Shanghai (CN); Ting Wang, Shanghai (CN); Qinghai Zeng, Shanghai (CN); Haibao Ren, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,781

(22) Filed: Apr. 8, 2020

(65) Prior Publication Data
US 2020/0236643 A1 Jul. 23, 2020

Related U.S. Application Data

(63) Continuation of application No. 15/984,221, filed on May 18, 2018, now Pat. No. 10,645,664, which is a
(Continued)

(30) Foreign Application Priority Data

Nov. 20, 2015 (CN) .......................... 201510819442.3

(51) Int. Cl.
*H04J 3/06* (2006.01)
*H04W 56/00* (2009.01)
(Continued)

(52) U.S. Cl.
CPC ......... *H04W 56/0015* (2013.01); *H04L 27/26* (2013.01); *H04L 27/2655* (2013.01); *H04W 4/02* (2013.01)

(58) Field of Classification Search
CPC ... H04W 56/0015; H04W 4/02; H04W 24/10; H04W 72/04; H04L 27/26; H04L 27/5655; H04L 5/001; H04L 5/00
See application file for complete search history.

(56) References Cited

U.S. PATENT DOCUMENTS

2013/0157660 A1 6/2013 Awad et al.
2014/0050206 A1* 2/2014 Seo ..................... H04J 11/0069
370/336
(Continued)

FOREIGN PATENT DOCUMENTS

CN 102271352 12/2011
CN 102440039 A 5/2012
(Continued)

*Primary Examiner* — Abdelnabi O Musa
(74) *Attorney, Agent, or Firm* — Womble Bond Dickinson (Us) LLP

(57) ABSTRACT

Embodiments of the present disclosure provide a downlink synchronization method, an apparatus, and a system, and relate to the communications field, so as to reduce downlink synchronization complexity and improve downlink synchronization efficiency. According to the downlink synchronization method, abase station sends downlink synchronization reference information to UE by using dedicated signaling or a system message, where the downlink synchronization reference information is used to instruct the UE to perform downlink synchronization in a second cell by referring to a downlink synchronization channel of a first cell; and the base station sends, in the second cell according to location information of the UE, a beam including a downlink synchronization channel to the UE, where the first cell and the second cell include an overlapped coverage area. The embodiments of the present disclosure are applied to synchronization channel sending.

18 Claims, 9 Drawing Sheets

Related U.S. Application Data continuation of application No. PCT/CN2016/106298, filed on Nov. 17, 2016.

(51) Int. Cl.
*H04L 27/26* (2006.01)
*H04W 4/02* (2018.01)

(56) References Cited

U.S. PATENT DOCUMENTS

| | | | |
|---|---|---|---|
| 2015/0009972 A1 | 1/2015 | Xu et al. | |
| 2015/0358848 A1* | 12/2015 | Kim | H04L 5/0053 370/252 |
| 2016/0044619 A1 | 2/2016 | Ryu et al. | |
| 2016/0088579 A1 | 3/2016 | Harada et al. | |
| 2016/0308637 A1* | 10/2016 | Frenne | H04J 11/0069 |
| 2016/0374033 A1* | 12/2016 | Nogami | H04L 5/001 |
| 2019/0082410 A1 | 3/2019 | Dinan | |

FOREIGN PATENT DOCUMENTS

| | | |
|---|---|---|
| CN | 103081550 | 5/2013 |
| CN | 104126328 A | 10/2014 |
| CN | 104796927 | 7/2015 |
| EP | 2819338 | 12/2014 |
| GB | 2493154 | 1/2013 |
| WO | 2013/135212 | 9/2013 |
| WO | 2014109105 | 7/2014 |
| WO | 2014169576 | 10/2014 |
| WO | 2015/080646 | 6/2015 |

\* cited by examiner

DOWNLINK SYNCHRONIZATION METHOD, AND APPARATUS AND SYSTEM

CROSS-REFERENCE TO RELATED APPLICATIONS

CROSS-REFERENCE TO RELATED APPLICATIONS

This application is a continuation of U.S. patent application Ser. No. 15/984,221, filed on May 18, 2018, which is a continuation of International Application No. PCT/CN2016/106298, filed on Nov. 17, 2016, which claims priority to Chinese Patent No. 201510819442.3, filed on Nov. 20, 2015. All of the afore-mentioned patent applications are herein incorporated by reference in their entireties.

TECHNICAL FIELD

Embodiments of the present application relate to the communications field, and in particular, to a downlink synchronization method, an apparatus, and a system.

BACKGROUND

As a packet service and an intelligent terminal rapidly develop, a high-speed service with a large data amount has an increasing requirement for a frequency spectrum. A millimeter wave is to become a potential target frequency spectrum for developing 5G (5th Generation) communications and 3GPP (3rd generation partnership project) Long Term Evolution Advanced (LTE-A) in the future. A centimeter wave frequency band generally refers to a frequency spectrum ranging from 3 GHz to 30 GHz, and a millimeter wave frequency band generally refers to a frequency spectrum ranging from 30 GHz to 300 GHz.

In the prior art, cellular communications such as LTE usually uses a frequency band of approximately 2 GHz or lower. An LTE-A small cell enhancement standardization project is studying and using a frequency band of 3.5 GHz. In the IEEE (Institute of Electrical and Electronics Engineers) 802.11ad standard, a frequency band of 60 GHz is used for a wireless local area network (WLAN), and is usually used for indoor communication at a short distance of approximately 10 meters. In the prior art, a frequency band of 6 GHz or higher has not been used in the cellular communications. A main challenge of using a millimeter-wave high frequency band in the cellular communications lies in that this wave band faces relatively large free-space attenuation; in addition, extremely severe attenuation is caused by absorption and scattering from air, rain, fog, buildings or other objects. A beamforming technology is considered as a potential technology that can compensate for a severe millimeter wave path loss. A massive multiple-input multiple-output (MIMO) system is considered as a potential direction for implementing the beamforming technology on a millimeter-wave frequency band.

The IEEE 802.11ad standard supports beamforming. A process of beam training between two nodes in communication is as follows: A node 1 separately sends training beacons in a plurality of different directions by using a beam, and a node 2 receives the training beacons in a quasi-omni manner and identifies an optimal beam a; then the node 2 separately sends beacons in a plurality of different directions by using a beam, and the node 1 receives the beacons in a quasi-omni manner and identifies an optimal beam b; and the node 2 reports the optimal beam a to the node 1, and the node 1 reports the optimal beam b to the node 2, so as to find an optimal matched beam pair. Subsequently, data communication is performed in directions of the beam pair. However, on a low frequency band in the cellular communications, a public signal of a cell such as a synchronization channel or a broadcast channel is usually transmitted in an omni transmission manner rather than by using the beamforming technology.

In LTE-A carrier aggregation (CA), larger bandwidth can be obtained by aggregating a plurality of contiguous or non-contiguous component carriers (CC), so that a peak data rate and a system throughput are increased. CCs aggregated for UE are referred to as a serving cell. The serving cell includes one primary cell (PCell) on a low frequency band and at most four secondary cells (SCell) on a high frequency band. The primary cell is responsible for security of a non-access stratum (NAS), and the secondary cell mainly provides additional radio resources for data communication. CA supports handover of the PCell and adding, deleting, activation, deactivation, and other operations on the SCell.

A downlink synchronization channel of the SCell may be sent in a short distance point-to-point communication manner in 802.11ad, or sent through omni transmission in the cellular communications. In addition, in the short distance point-to-point communication manner in 802.11ad, a base station and UE need to separately send training beacons to each other in a plurality of different directions, so as to perform omni or quasi-omni beam training. A beam training process is relatively complex, and has a relatively large delay and relatively low system efficiency. Consequently, channel resources are wasted when the downlink synchronization channel is transmitted in the omni transmission manner. When the millimeter-wave high frequency band is applied to a cellular communications system, the base station may use the beamforming technology to extend public channel coverage. However, in the prior art, a method for performing downlink synchronization in an SCell cannot be provided when beamforming is directly applied to the cellular communications system.

SUMMARY

Embodiments of the present disclosure provide a downlink synchronization method, an apparatus, and a system, so that downlink synchronization can be implemented in a cellular communications system through beamforming.

According to a first aspect, a downlink synchronization method is provided, including:

sending, by a base station, downlink synchronization reference information to UE by using dedicated signaling or a system message, where the downlink synchronization reference information is used to instruct the UE to perform downlink synchronization in a second cell by referring to a downlink synchronization channel of a first cell; and sending, by the base station in the second cell according to location information of the UE, a beam including a downlink synchronization channel to the UE, where the first cell and the second cell include an overlapped coverage area.

According to the downlink synchronization method provided in this solution, the base station sends the downlink synchronization reference information to the UE by using the dedicated signaling or the system message, and sends, in the second cell according to the location information of the UE, the beam including a downlink synchronization channel to the UE, so that the UE detects, according to the received downlink synchronization reference information, the downlink synchronization channel in the beam sent by the base station. The downlink synchronization reference information can be used to instruct the UE to perform downlink synchronization in the second cell by referring to the downlink synchronization channel of the first cell, so that downlink synchronization is implemented in a cellular communications system through beamforming.

With reference to the first aspect, in a first possible implementation, before the sending, by the base station in the second cell, a downlink synchronization channel to the UE according to location information of the UE, the method further includes:

determining, by the base station, that the UE needs to perform downlink synchronization in the second cell.

Specifically, the determining, by the base station, that the UE needs to perform downlink synchronization in the second cell includes:

detecting, by the base station, a time length for sending the downlink synchronization channel in the second cell to the UE; and when determining that no downlink synchronization channel is sent in the second cell to the UE in a preset time length, determining that the UE needs to perform downlink synchronization; or determining, by the base station according to a status of detecting and receiving a sounding reference signal SRS of the UE in the second cell, that the UE needs to perform downlink synchronization; or determining, by the base station according to a bit error rate or a block error rate during data transmission in the second cell with the UE, that the UE needs to perform downlink synchronization.

In this solution, the base station may actively trigger sending of the downlink synchronization channel when determining that the UE needs to perform downlink synchronization in the second cell.

Alternatively, the determining, by the base station, that the UE needs to perform downlink synchronization in the second cell includes:

receiving, by the base station, a downlink synchronization request of the UE; and determining, by the base station according to the downlink synchronization request, that the UE needs to perform downlink synchronization.

In this embodiment, when determining that the UE needs to perform downlink synchronization in the second cell, the UE may actively trigger a request for asking the base station to send the downlink synchronization channel in the second cell.

With reference to the first aspect or the first possible implementation, in a second possible implementation, before the sending, by a base station, downlink synchronization reference information to UE by using dedicated signaling or a system message, the method further includes:

configuring, by the base station, carrier aggregation for the UE, where on an aggregated carrier, the first cell is on a carrier whose frequency domain is located on a first frequency band, the second cell is on a carrier whose frequency domain is located on a second frequency band, the first frequency band is a relatively low frequency band, and the second frequency band is a relatively high frequency band.

With reference to anyone of the first aspect or the foregoing possible implementations, in a third possible implementation, after the sending, by the base station in the second cell, a downlink synchronization channel to the UE according to location information of the UE, the method further includes:

receiving a detection result that is of a downlink synchronization channel of the second cell and that is reported by the UE; and determining, by the base station according to the detection result, whether to configure the second cell as a serving cell of the UE.

In this solution, the base station can determine, according to the detection result, whether to configure the second cell as the serving cell of the UE. Therefore, the base station may send a same downlink synchronization reference signal to all UEs in the second cell, and determine, according to a detection result that is of the downlink synchronization channel of the second cell and that is reported by UE, whether to configure the second cell as a serving cell of the UE. A unified downlink synchronization reference signal is designed for all the UEs, so that signaling design overheads are reduced.

With reference to anyone of the first aspect or the foregoing possible implementations, in a fourth possible implementation, the sending, by the base station in the second cell, a downlink synchronization channel to the UE according to location information of the UE includes:

sending, by the base station at any OFDM symbol location in a subframe in the second cell according to the location information, the beam including a downlink synchronization channel to the UE.

Optionally, each OFDM symbol location is corresponding to one beam. All UEs in a coverage area of one beam may receive a downlink synchronization channel included in the beam. Two different beams are two beams whose maximum radiation directions do not overlap.

With reference to any one of the first aspect, or the first to the third possible implementations, in a fifth possible implementation, the sending, by the base station in the second cell, a downlink synchronization channel to the UE according to location information of the UE includes:

sending, by the base station at a fixed OFDM symbol location in any subframe in the second cell according to the location information, the beam including a downlink synchronization channel to the UE.

Optionally, each OFDM symbol location is corresponding to one beam. All UEs in a coverage area of one beam may receive a downlink synchronization channel included in the beam.

With reference to anyone of the first aspect or the foregoing possible implementations, in a sixth possible implementation, each OFDM symbol includes beams in at least two directions, and all the beams in the at least two directions use different radio frequency chains RF chains.

In addition, a fixed time offset is used between a time location of a beam of the downlink synchronization channel of the second cell and a time location of a beam of the downlink synchronization channel of the first cell. The downlink synchronization reference information may further include but is not limited to at least one of the following information: a mapping relationship between the time offset and a beam ID of the downlink synchronization channel of the second cell, a frequency band of the second cell, bandwidth of the second cell, a physical cell identifier (PCI) of the second cell, a frequency range in which the downlink synchronization channel of the second cell is located, a quantity of beams of the second cell, or a beam width of the second cell.

According to a second aspect, a downlink synchronization method is provided, including:

receiving, by UE, downlink synchronization reference information sent by a base station by using dedicated signaling or a system message, where the downlink synchronization reference information is used to instruct the UE to perform downlink synchronization in a second cell by referring to a downlink synchronization channel of a first cell; and detecting, by the UE according to the downlink synchronization reference information, a downlink synchronization channel of the second cell in a beam sent by the base station, where the first cell and the second cell includes an overlapped coverage area.

According to the downlink synchronization method provided in this solution, the base station sends the downlink synchronization reference information to the UE by using the dedicated signaling or the system message, and sends, in the second cell according to the location information of the UE, the beam including a downlink synchronization channel to the UE, so that the UE detects the downlink synchronization channel according to the received downlink synchronization reference information. The downlink synchronization reference information can be used to instruct the UE to perform downlink synchronization in the second cell by referring to the downlink synchronization channel of the first cell, so that downlink synchronization is implemented in a cellular communications system through beamforming.

With reference to the second aspect, in a first possible implementation, after the detecting, by the UE, a downlink synchronization channel of the second cell according to the downlink synchronization reference information, the method further includes:

reporting, by the UE, a detection result of the downlink synchronization channel of the second cell to the base station.

In this solution, the base station can determine, according to the detection result, whether to configure the second cell as the serving cell of the UE. Therefore, the base station may send a same downlink synchronization reference signal to all UEs in the second cell, and determine, according to a detection result that is of the downlink synchronization channel of the second cell and that is reported by each UE, whether to configure the second cell as a serving cell of the UE. A unified downlink synchronization reference signal is designed for all the UEs, so that signaling design overheads are reduced.

With reference to the second aspect or the first possible implementation, in a second possible implementation, before the detecting, by the UE, a downlink synchronization channel of the second cell according to the downlink synchronization reference information, the method further includes:

determining, by the UE, that the UE needs to perform downlink synchronization with the base station; and sending, by the UE, a downlink synchronization request to the base station.

In this solution, the base station may actively trigger sending of the downlink synchronization channel when determining that the UE needs to perform downlink synchronization in the second cell.

With reference to the second possible implementation, in a third possible implementation, the determining, by the UE, that the UE needs to perform downlink synchronization with the base station includes:

detecting, by the UE, a time length for receiving, in the second cell, the downlink synchronization channel sent by the base station; and when determining that no downlink synchronization channel sent by the base station is received in the second cell in a preset time length, determining, by the UE, that the UE needs to perform downlink synchronization with the base station; or determining, by the UE according to a status of detecting and receiving an SRS in the second cell, that the UE needs to perform downlink synchronization with the base station; or determining, by the UE according to a bit error rate or a block error rate during data transmission with the base station in the second cell, that the UE needs to perform downlink synchronization with the base station.

In this solution, when determining that the UE needs to perform downlink synchronization in the second cell, the UE may actively trigger a request for asking the base station to send the downlink synchronization channel in the second cell.

With reference to anyone of the second aspect or the possible implementations of the second aspect, in a fourth possible implementation, the detecting, by the UE according to the downlink synchronization reference information, a downlink synchronization channel of the second cell in a beam sent by the base station includes:

detecting, by the UE according to information about the downlink synchronization channel of the first cell, the downlink synchronization channel of the second cell in the beam sent by the base station.

According to a third aspect, a base station is provided, including:

a sending unit, configured to send downlink synchronization reference information to UE by using dedicated signaling or a system message, where the downlink synchronization reference information is used to instruct the UE to perform downlink synchronization in a second cell by referring to a downlink synchronization channel of a first cell, where the sending unit is further configured to send, in the second cell according to location information of the UE, a beam including a downlink synchronization channel to the UE, where the first cell and the second cell include an overlapped coverage area.

The base station provided in this solution sends the downlink synchronization reference information to the UE by using the dedicated signaling or the system message, and sends, in the second cell according to the location information of the UE, the beam including a downlink synchronization channel to the UE, so that the UE detects, according to the received downlink synchronization reference information, the downlink synchronization channel in the beam sent by the base station. The downlink synchronization reference information can be used to instruct the UE to perform downlink synchronization in the second cell by referring to the downlink synchronization channel of the first cell, so that downlink synchronization is implemented in a cellular communications system through beamforming.

With reference to the third aspect, in a first possible implementation, the base station further includes:

a processing unit, configured to determine that the UE needs to perform downlink synchronization in the second cell.

Specifically, the processing unit is configured to detect a time length for sending the downlink synchronization channel in the second cell to the UE; and when determining that no downlink synchronization channel is sent in the second cell to the UE in a preset time length, the processing unit determines that the UE needs to perform downlink synchronization; or the processing unit is configured to determine, according to a status of detecting and receiving a sounding reference signal SRS of the UE in the second cell, that the UE needs to perform downlink synchronization; or the processing unit is configured to determine, according to a bit error rate or a block error rate during data transmission in the second cell with the UE, that the UE needs to perform downlink synchronization.

In this solution, the base station may actively trigger sending of the downlink synchronization channel when determining that the UE needs to perform downlink synchronization in the second cell.

Alternatively, the base station further includes a receiving unit, configured to receive a downlink synchronization request of the UE.

The processing unit is configured to determine, according to the downlink synchronization request, that the UE needs to perform downlink synchronization.

In this embodiment, when determining that the UE needs to perform downlink synchronization in the second cell, the UE may actively trigger a request for asking the base station to send the downlink synchronization channel in the second cell.

With reference to the third aspect or the first possible implementation, in a second possible implementation, the base station further includes:

a configuration unit, configured to configure carrier aggregation for the UE, where on an aggregated carrier, the first cell is on a carrier whose frequency domain is located on a first frequency band, the second cell is on a carrier whose frequency domain is located on a second frequency band, the first frequency band is a relatively low frequency band, and the second frequency band is a relatively high frequency band.

With reference to anyone of the third aspect or the foregoing possible implementations, in a third possible implementation, the receiving unit is configured to receive a detection result that is of a downlink synchronization channel of the second cell and that is reported by the UE; and the processing unit is configured to determine, according to the detection result received by the receiving unit, whether to configure the second cell as a serving cell of the UE.

In this solution, the base station can determine, according to the detection result, whether to configure the second cell as the serving cell of the UE. Therefore, the base station may send a same downlink synchronization reference signal to all UEs in the second cell, and determine, according to a detection result that is of the downlink synchronization channel of the second cell and that is reported by each UE, whether to configure the second cell as a serving cell of the UE. A unified downlink synchronization reference signal is designed for all the UEs, so that signaling design overheads are reduced.

With reference to anyone of the third aspect or the foregoing possible implementations, in a fourth possible implementation, the sending unit is specifically configured to send, at different OFDM symbol locations in a subframe in the second cell according to the location information, different beams including a downlink synchronization channel to the UE.

With reference to any one of the third aspect, or the first to the third possible implementations, in a fifth possible implementation, the sending unit is specifically configured to send, at a fixed OFDM symbol location in each subframe in the second cell according to the location information, different beams including a downlink synchronization channel to the UE.

With reference to anyone of the third aspect or the foregoing possible implementations, in a sixth possible implementation, each OFDM symbol includes beams in at least two directions, and all the beams in the at least two directions use different radio frequency chains RF chains.

In addition, a fixed time offset is used between a time location of a beam of the downlink synchronization channel of the second cell and a time location of a beam of the downlink synchronization channel of the first cell. The downlink synchronization reference information includes a mapping relationship between the time offset and a beam ID of the downlink synchronization channel of the second cell. The downlink synchronization reference information may further include but is not limited to at least one of the following information: a frequency band of the second cell, bandwidth of the second cell, a physical cell identifier (PCI) of the second cell, a frequency range in which the downlink synchronization channel of the second cell is located, a quantity of beams of the second cell, or a beam width of the second cell.

According to a fourth aspect, UE is provided, including:

a receiving unit, configured to receive downlink synchronization reference information sent by a base station by using dedicated signaling or a system message, where the downlink synchronization reference information is used to instruct the UE to perform downlink synchronization in a second cell by referring to a downlink synchronization channel of a first cell; and a detection unit, configured to detect, according to the downlink synchronization reference information received by the receiving unit, a downlink synchronization channel of the second cell in a beam sent by the base station, where the first cell and the second cell include an overlapped coverage area.

In this solution, the base station sends the downlink synchronization reference information to the UE by using the dedicated signaling or the system message, and sends, in the second cell according to location information of the UE, the beam including a downlink synchronization channel to the UE, so that the UE detects the downlink synchronization channel according to the received downlink synchronization reference information. The downlink synchronization reference information can be used to instruct the UE to perform downlink synchronization in the second cell by referring to the downlink synchronization channel of the first cell, so that downlink synchronization is implemented in a cellular communications system through beamforming.

With reference to the fourth aspect, in a first possible implementation, the UE further includes:

a sending unit, configured to report a detection result of the downlink synchronization channel of the second cell to the base station.

With reference to the fourth aspect or the first possible implementation, in a second possible implementation, the UE further includes:

a processing unit, configured to determine that the UE needs to perform downlink synchronization with the base station; and the sending unit is configured to send a downlink synchronization request to the base station.

In this solution, when determining that the UE needs to perform downlink synchronization in the second cell, the UE may actively trigger a request for asking the base station to send the downlink synchronization channel in the second cell.

With reference to the second possible implementation, in a third possible implementation, the processing unit is specifically configured to detect a time length for receiving, in the second cell, the downlink synchronization channel sent by the base station; and when determining that no downlink synchronization channel sent by the base station is received in the second cell in a preset time length, the processing unit determines that the UE needs to perform downlink synchronization with the base station; or the processing unit determines, according to a status of detecting and receiving an SRS in the second cell, that the UE needs to perform downlink synchronization with the base station; or the processing unit determines, according to a bit error rate or a block error rate during data transmission with the base station in the second cell, that the UE needs to perform downlink synchronization with the base station.

In this solution, when determining that the UE needs to perform downlink synchronization in the second cell, the UE may actively trigger a request for asking the base station to send the downlink synchronization channel in the second cell.

With reference to the fourth aspect, in a third possible implementation, the UE further includes:

a sending unit, configured to report a detection result of the downlink synchronization channel to the base station.

With reference to anyone of the fourth aspect or the possible implementations of the fourth aspect, in a fourth possible implementation, the detection unit is specifically configured to detect, according to information about the downlink synchronization channel of the first cell, the downlink synchronization channel of the second cell in the beam sent by the base station.

According to a fifth aspect, a base station is provided, including a processor, a first interface circuit, a second interface circuit, a memory, and a bus. The processor, the first interface circuit, the second interface circuit and the memory are connected to each other and communicate with each other by using the bus. The processor is configured to execute a program in the memory, to perform the method provided in the first aspect or the possible implementations of the first aspect with reference to the first interface circuit and the second interface circuit.

Optionally, the processor may be configured to execute functions of the processing unit and the configuration unit in the third aspect or the possible implementations of the third aspect.

The first interface circuit is configured to execute a function of the sending unit in the third aspect or the possible implementations of the third aspect.

The second interface circuit is configured to execute a function of the receiving unit in the third aspect or the possible implementations of the third aspect.

According to a sixth aspect, UE is provided, including a processor, a first interface circuit, a second interface circuit, a memory, and a bus. The processor, the first interface circuit, the second interface circuit, and the memory are connected to each other and communicate with each other by using the bus.

The processor is configured to execute a program in the memory, to perform the method provided in the second aspect or the possible implementations of the second aspect with reference to the first interface circuit and the second interface circuit.

Optionally, the processor may be configured to execute functions of the detection unit and the processing unit in the fourth aspect or the possible implementations of the fourth aspect.

The first interface circuit is configured to execute a function of the receiving unit in the fourth aspect or the possible implementations of the fourth aspect.

The second interface circuit is configured to execute a function of the sending unit in the fourth aspect or the possible implementations of the fourth aspect.

According to a seventh aspect, a communications system is provided, including any base station provided in the third aspect or the possible implementations of the third aspect and any UE provided in the fourth aspect or the possible implementations of the fourth aspect; or including any base station provided in the fifth aspect and any UE provided in the sixth aspect.

DESCRIPTION OF EMBODIMENTS

Figure 1:
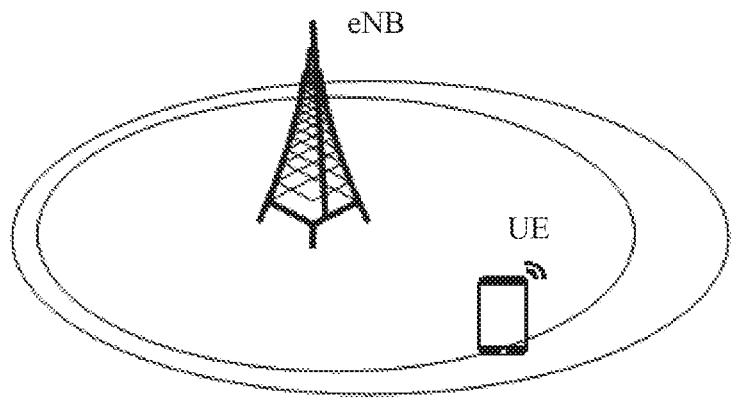
FIG. 1 is a schematic structural diagram of a communications system according to an embodiment of the present disclosure.

The following describes the technical solutions in the embodiments of the present disclosure with reference to the accompanying drawings in the embodiments of the present disclosure.

Terms such as "component", "module", and "system" used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

In addition, this application describes each aspect with reference to a wireless network device. The wireless network device may be a base station. The base station may be configured to communicate with one or more user equipments, or may be configured to communicate with one or more base stations having some functions of user equipment (for example, communication between a macro base station and a micro base station such as an access point). Alternatively, the wireless network device may be user equipment. The user equipment may be configured to communicate with one or more user equipments (for example, D2D communication), or may be configured to communicate with one or more base stations. The user equipment may be further referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone set, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device configured for communication in a wireless system. The base station may be further referred to as an access point, a node, a node B, an evolved node B (eNB), or another network entity, and may include some or all functions of the foregoing network entities. The base station may communicate with a wireless terminal by using an air interface. The communication may be performed by using one or more sectors. The base station may convert a received air interface frame into an IP packet, and is used as a router between the wireless terminal and a remaining part of an access network. The access network includes an Internet Protocol (IP) network. The base station may further coordinate air interface attribute management, and may be further used as a gateway between a wired network and a wireless network.

All aspects, embodiments, or features are presented in this application by describing a system that may include multiple devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of the present disclosure is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of the present disclosure, information, signal, message, and channel may be interchangeably used sometimes. It should be noted that expressed meanings of the foregoing terms are consistent when differences are not emphasized. In addition, "of", "corresponding, relevant", and "corresponding" may be interchangeably used sometimes. It should be noted that expressed meanings of the foregoing terms are consistent when differences are not emphasized.

Network architectures and service scenarios described in the embodiments of the present disclosure are to describe the technical solutions in the embodiments of the present disclosure more clearly, but are not intended to limit the technical solutions provided in the embodiments of the present disclosure. A person of ordinary skill in the art may understand that, with evolution of the network architectures and appearance of anew service scenario, the technical solutions provided in the embodiments of the present disclosure may still be applied to a similar technical problem.

The embodiments of the present disclosure may be applied to not only a time division duplex (TDD) scenario but also a frequency division duplex (FDD) scenario.

In the embodiments of the present disclosure, a 4G network scenario in a wireless communications network is used for description. It should be noted that the solutions in the embodiments of the present disclosure may be further applied to another wireless communications network, and a corresponding name may also be replaced with a name of a corresponding function in the another wireless communications network.

The embodiments of the present disclosure may be applied to an LTE-A carrier aggregation technology. Carrier aggregation (CA) is performed on a carrier with a relatively low frequency band and a carrier with a relatively high frequency band (such as a millimeter wave and a centimetric wave) in the LTE-A technology, so as to provide larger bandwidth and capacity for user equipment UE. A carrier with a relatively low frequency band serves as a primary cell PCell. A carrier with a relatively high frequency band serves as a secondary cell SCell. The PCell and the SCell are co-located. The PCell and the SCell are covered by one base station or respectively covered by two different base stations. The SCell is located within a coverage area of the PCell, or coverage areas of the SCell and the PCell overlap. The relatively high frequency band and the relatively low frequency band are relative concepts. That is, a frequency band used by the SCell is higher than a frequency band used by the PCell. The SCell is not necessarily limited to a high frequency cell in the present disclosure, and this is applicable to any scenario in which a synchronization channel is sent in the SCell through beamforming. FIG. 1 is a schematic diagram of composition of a communications system according to an embodiment of the present disclosure. An example in which a single eNB (evolved NodeB) communicates with user equipment (UE) is used for description in the present disclosure. This embodiment of the present disclosure also supports a scenario in which the UE communicates with the eNB by using only a high frequency cell rather than through CA. However, the UE may obtain, by using a low frequency cell, information related to the high frequency cell.

Figure 2:
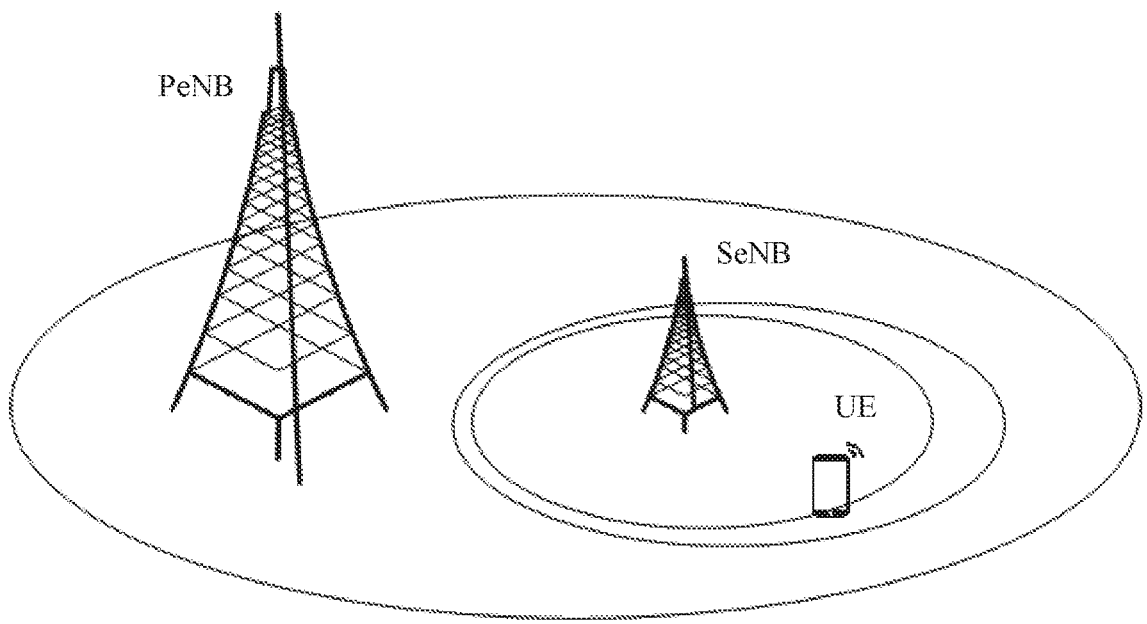
FIG. 2 is a schematic structural diagram of a communications system according to another embodiment of the present disclosure.

This embodiment of the present disclosure is also applicable to a dual-connection scenario. This scenario includes backhaul communication between a primary eNodeB (PeNB) of a PCell on a low frequency band and a secondary eNodeB (SeNB) of an SCell on a high frequency band and backhaul communication between a primary secondary cell (PSCell) on a low frequency band and the secondary eNodeB of the SCell on a high frequency band. As shown in FIG. 2, the PCell provides wide coverage and mobility management. The PSCell and the SCell mainly provide hotspot coverage to increase a data communication throughput. In terms of a solution, a dual-connection scenario in FIG. 2 in which a PSCell and an SCell provided by an SeNB are combined is similar to a scenario in FIG. 1 in which one eNB performs CA. Therefore, the system shown in FIG. 1 is mainly used as an example for description in the embodiments of the present disclosure. A beamforming technology related in each embodiment of the present disclosure may refer to a horizontal beam or a vertical beam, or refer to a horizontal beam and a vertical beam.

Figure 3:
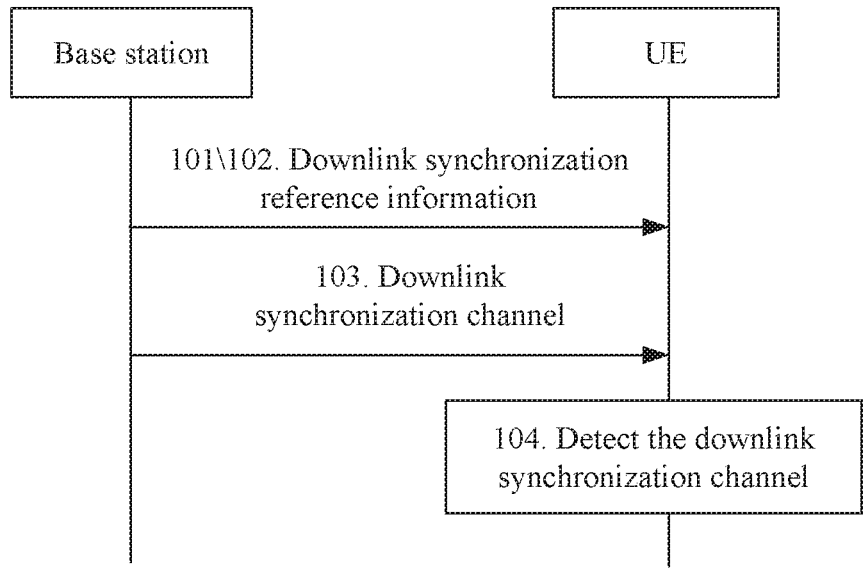
FIG. 3 is a schematic flowchart of a downlink synchronization method according to an embodiment of the present disclosure.

Based on the communications system provided above, referring to FIG. 3, an embodiment of the present disclosure provides a downlink synchronization method. The method includes the following steps.

101. A base station sends downlink synchronization reference information to UE by using dedicated signaling or a system message.

The downlink synchronization reference information is used to instruct the UE to perform downlink synchronization in a second cell by referring to a downlink synchronization channel of a first cell. The first cell and the second cell include an overlapped coverage area. The dedicated signaling or system message may be sent by the base station by using the first cell or the second cell.

The UE and the base station are synchronous in downlink in the first cell, and the UE and the base station are synchronous or nonsynchronous in downlink in the second cell. If the UE and the base station are nonsynchronous in downlink in the second cell, the base station sends the downlink synchronization reference information to the UE by using dedicated signaling or a system message of the first cell. Alternatively, if the UE and the base station are synchronous in downlink in the second cell, the base station may send the downlink synchronization reference information to the UE by using dedicated signaling or a system message of the first cell, or the base station may send the downlink synchronization reference information to the UE by using dedicated signaling or a system message of the second cell. When the UE and the base station are synchronous in downlink in the second cell, the base station or the UE may periodically trigger sending of the downlink synchronization reference information, so as to ensure downlink synchronous state of the UE in the second cell. Alternatively, when detecting a deteriorated downlink synchronous state of the UE in the second cell, the base station or the UE triggers sending of the downlink synchronization reference information.

A fixed time offset is used between a time location of a beam of a downlink synchronization channel of the second cell and a time location of a beam of the downlink synchronization channel of the first cell. The downlink synchronization reference information may further include but is not limited to at least one of the following information: a mapping relationship between the time offset and a beam ID of the downlink synchronization channel of the second cell, a frequency band of the second cell, bandwidth of the second cell, a physical cell identifier (PCI) of the second cell, a frequency range in which the downlink synchronization channel of the second cell is located, a quantity of beams of the second cell, or a beam width of the second cell.

102. The UE receives the downlink synchronization reference information sent by the base station by using the dedicated signaling or the system message.

103. The base station sends, in a second cell according to location information of the UE, a beam including a downlink synchronization channel to the UE.

Before step 103, the base station may first obtain the location information of the UE. The UE may report, in a previous process in which the UE interacts with the base station, the location information of the UE by using any cell that serves the UE. Optionally, the location information may be beam index information.

Because a location of the UE can be obtained, when sending the downlink synchronization channel in the second cell to the UE, the base station may configure, in preset time, the downlink synchronization channel only in a beam that points to the UE.

104. The UE detects, according to the downlink synchronization reference information, a downlink synchronization channel of the second cell in the beam sent by the base station.

Specifically, step 104 is as follows: The UE detects, according to information about the downlink synchronization channel of the first cell, the downlink synchronization channel of the second cell in the beam sent by the base station, for example, detects the downlink synchronization channel of the second cell by referring to a frequency resource in which the downlink synchronization channel of the first cell is located, for example, detection is performed near a center frequency in which the downlink synchronization channel of the first cell is located; and/or detects the downlink synchronization channel of the second cell by referring to a time domain resource in which the downlink synchronization channel of the first cell is located, for example, detection is performed near a time at which the downlink channel of the first cell is sent. For detection on the downlink synchronization channel of the second cell, refer to the prior art. Details are not described herein.

Further, during detection of the downlink synchronization channel in the second cell with reference to the downlink synchronization reference information in this application, detection efficiency of the downlink synchronization channel may be further improved. For example, a fixed time offset is used between a time location of a beam of the downlink synchronization channel of the second cell and a time location of a beam of the downlink synchronization channel of the first cell. The downlink synchronization reference information includes a mapping relationship between the time offset and a beam ID of the downlink synchronization channel of the second cell. After obtaining the mapping relationship between the time offset and the beam ID of the downlink synchronization channel of the second cell, the UE may quickly detect the downlink synchronization channel of the second cell according to the time offset by referring to the downlink synchronization channel of the first cell. The beam ID is preconfigured for the UE or obtained each time the UE communicates with the base station by using a beam. The beam ID is corresponding to a fixed time offset. Therefore, when receiving the beam sent by the base station, the UE may determine, according to the beam ID, the time offset between the time location of the beam of the downlink synchronization channel of the second cell and a time location of a beam of the downlink synchronization channel of the first cell. In addition, the UE may quickly detect the downlink synchronization channel of the second cell by referring to the information about the downlink synchronization channel of the first cell.

In addition, the UE may further detect the downlink synchronization channel on a frequency band and bandwidth of the second cell that are indicated by the base station, or detect the downlink synchronization channel in a frequency range in which the downlink synchronization channel of the second cell is located and that is indicated by the base station.

In step 104, the UE may obtain, in a time window specified by the base station or configured by the UE itself and by using the downlink synchronization reference information obtained in step 102, a downlink synchronization channel for synchronizing with the second cell. If no downlink synchronization channel is received in a preset time window, or no downlink synchronization channel is detected in an SCell in the preset time window, the UE reports error indication information to the base station, and re-searches another cell and reports a measurement result to the base station. The UE may trigger detection on a downlink synchronization channel of a neighboring high frequency cell and measurement on the high frequency cell according to a measurement result of a neighboring low frequency cell, and try to request the downlink synchronization channel in the measured high frequency cell. The UE may obtain time window information according to an identifier of a beam in which the UE is currently located and information about a time offset between a downlink synchronization channel of the beam and a downlink synchronization channel of a PCell.

After step 104, if the UE successfully detects the downlink synchronization channel in the SCell, the UE may send indication information to the base station at a preconfigured time-frequency resource location, to notify the base station that the UE successfully performs downlink synchronization in the SCell.

According to the downlink synchronization method provided in this solution, the base station sends the downlink synchronization reference information to the UE by using the dedicated signaling or the system message, and sends, in the second cell according to the location information of the UE, the beam including a downlink synchronization channel to the UE, so that the UE detects, according to the received downlink synchronization reference information, the downlink synchronization channel in the beam sent by the base station. The downlink synchronization reference information can be used to instruct the UE to perform downlink synchronization in the second cell by referring to the downlink synchronization channel of the first cell, so that downlink synchronization is implemented in a cellular communications system through beamforming.

Figure 4:
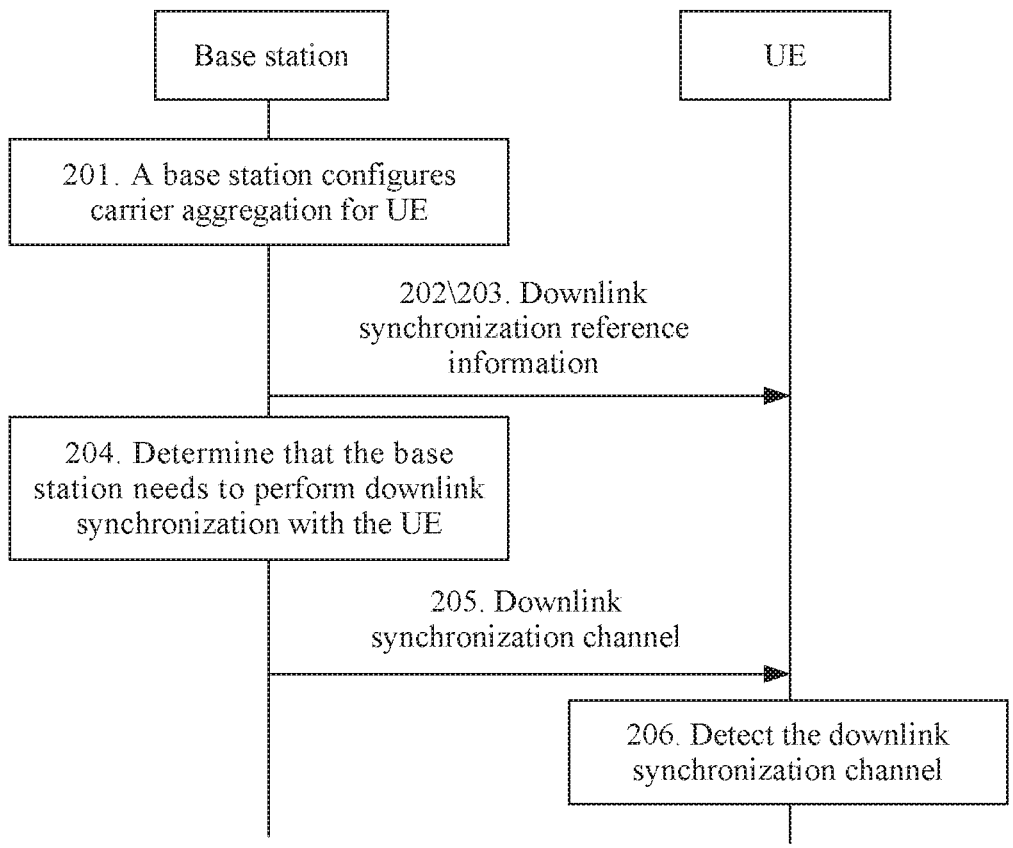
FIG. 4 is a schematic flowchart of a downlink synchronization method according to another embodiment of the present disclosure.

Specifically, for example, the first cell is a PCell, and the second cell is an SCell. The base station may send the downlink synchronization channel to specified UE that needs to perform downlink synchronization in the SCell. The following solution provides a downlink synchronization method triggered by the base station. The base station actively triggers sending of the downlink synchronization channel when determining that the UE needs to perform downlink synchronization in the SCell. Referring to FIG. 4, the method includes the following steps.

201. The base station configures carrier aggregation for the UE.

On an aggregated carrier, the PCell is on a carrier whose frequency domain is located on a first frequency band, and the SCell is on a carrier whose frequency domain is located on a second frequency band. The first frequency band is a relatively low frequency band, and the second frequency band is a relatively high frequency band. For example, the PCell is on a carrier whose frequency domain is located on a low frequency band (for example, less than 3 GHz), and the SCell is on a carrier whose frequency domain is located on a high frequency band (for example, a centimetric wave frequency band or a millimeter wave frequency band of 3.5 GHz, 5 GHz, over 6 GHz, or the like). The PCell uses a frame structure the same as that of the SCell, or the PCell uses a frame structure whose subframe length, symbol length, and subcarrier spacing are separately multiples of those of a frame structure of the SCell.

202. The base station sends downlink synchronization reference information to the UE by using dedicated signaling or a system message.

203. The UE receives the downlink synchronization reference information sent by the base station by using the system message of a PCell or the dedicated signaling.

204. The base station determines that the UE needs to perform downlink synchronization (has a downlink synchronization requirement).

In step 204, the base station may determine, in at least one of the following manners or a combination of a plurality of the following manners, that the UE needs to perform downlink synchronization.

Manner 1: The base station detects a time length for sending the downlink synchronization channel to the UE in the SCell; and when determining that no downlink synchronization channel is sent to the UE in the SCell in a preset time length, the base station determines that the UE needs to perform downlink synchronization. An example is provided for Manner 1: After sending the synchronization channel, based on a timer or a time counter, the base station starts or restarts the timer or resets the time counter to restart timing, so as to accordingly determine the preset time length.

Manner 2: The base station determines, according to a status of detecting and receiving a sounding reference signal (SRS) of the UE in the SCell, that the UE needs to perform downlink synchronization. For example, if the base station determines that, at a preset orthogonal frequency division multiplexing (OFDM) symbol location, the UE does not detect a reference signal, or detects a time offset or a frequency offset between an OFDM symbol location of a reference signal and a pre-estimated location, the base station determines that the UE needs to perform downlink synchronization.

Manner 3: The base station determines, according to a bit error rate or a block error rate during data transmission with the UE in the SCell, that the UE needs to perform downlink synchronization. For example, if the base station determines that the bit error rate or the block error rate during data transmission with the UE in the SCell exceeds a preset threshold, the base station determines that the UE needs to perform downlink synchronization with the base station.

Certainly, after the UE configures a new SCell or activates the SCell, the base station may actively trigger sending of the downlink synchronization channel to the UE.

Manner 4: The base station determines, according to a received downlink synchronization request message of the UE, that the UE needs to perform downlink synchronization.

The UE may send the downlink synchronization request message by using an uplink channel configured by the base station. The uplink channel may be an uplink channel of the PCell. Certainly, if the UE is in an uplink synchronous state in the SCell, the uplink channel may be an uplink channel of the SCell.

205. When the base station determines that the UE needs to perform downlink synchronization in an SCell, the base station sends, according to location information of the UE, a beam including a downlink synchronization channel to the UE in the SCell.

Before step 205, the base station may first obtain the location information of the UE. For example, the base station periodically obtains the location information of the UE, or obtains location information actively reported by the UE. For example, the UE may report, in a previous process in which the UE interacts with the base station, the location information of the UE by using any cell that serves the UE. The location information may be beam index information. The base station may determine a spatial location of the UE by using information of the UE in the PCell such as uplink information or channel state information (CSI), for example, determine the spatial location of the UE in the foregoing manner in a line of sight (LOS), so that a path loss of the uplink information or the CSI can be detected. A signal sending direction and a signal receiving direction can be obtained by the base station, and a signal is attenuated after the signal is transmitted in the air for a distance. Therefore, a fixed path loss may be corresponding to a distance of the UE relative to the base station.

Specifically, the base station may periodically send the downlink synchronization channel in the PCell, for example, send a primary synchronization channel (PSS) and a secondary synchronization channel (SSS) once each 5 ms according to an existing LTE technology. To distinguish between two half-frames of a radio frame, different SSSs are usually sent in the first 5 ms and the last 5 ms of the radio frame. For example, the SSSs may be encoded differently. The PSS/SSS may spatially cover the entire PCell, for example, cover a 120-degree sector area. A sequence of step 205 is not limited in this application. Step 205 may be performed at any moment after the base station configures carrier aggregation for the UE, provided that step 205 is performed before the UE detects the downlink synchronization channel according to the downlink synchronization reference information. An encoding format and a channel format of the downlink synchronization channel are not limited in this application. For example, the downlink synchronization channel may use a manner similar to that of combining two synchronization channels PSS and SSS in LTE, or the downlink synchronization channel may be a single synchronization channel, and does not use a manner similar to that of combining two synchronization channels PSS and SSS in LTE.

Optionally, the base station may instruct, in advance by using the PCell or the SCell, the UE to prepare to receive the downlink synchronization channel in the SCell. The base station may instruct the UE to receive information in the SCell such as a start time or a beam range of the downlink synchronization channel. The base station sends, by using a beam, the downlink synchronization channel to the spatial location of the UE. The base station sends the downlink synchronization channel in the SCell and the downlink synchronization channel in the PCell synchronously in time domain. For example, a fixed time offset relationship exists in time domain between a specified beam (a specified beam identifier may be indicated by using a beam ID) of sending a downlink synchronization channel in the SCell and a time at which a downlink synchronization channel is sent in the PCell. If the base station cannot accurately determine the spatial location of the UE, the base station may send, in a specific spatial area, a plurality of beams including a downlink synchronization channel to the UE.

206. The UE detects, according to the downlink synchronization reference information, a downlink synchronization channel of the SCell in the beam sent by the base station.

According to the downlink synchronization method provided in this embodiment of the present disclosure, the base station sends the downlink synchronization reference information to the UE by using the dedicated signaling or the system message, and sends, in the second cell according to the location information of the UE, the beam including a downlink synchronization channel to the UE, so that the UE detects, according to the received downlink synchronization reference information, the downlink synchronization channel in the beam sent by the base station. The downlink synchronization reference information can be used to instruct the UE to perform downlink synchronization in the second cell by referring to the downlink synchronization channel of the first cell, so that downlink synchronization is implemented in a cellular communications system through beamforming. In addition, in this embodiment, the base station may actively trigger sending of the downlink synchronization channel when determining that the UE needs to perform downlink synchronization in the second cell.

Figure 5:
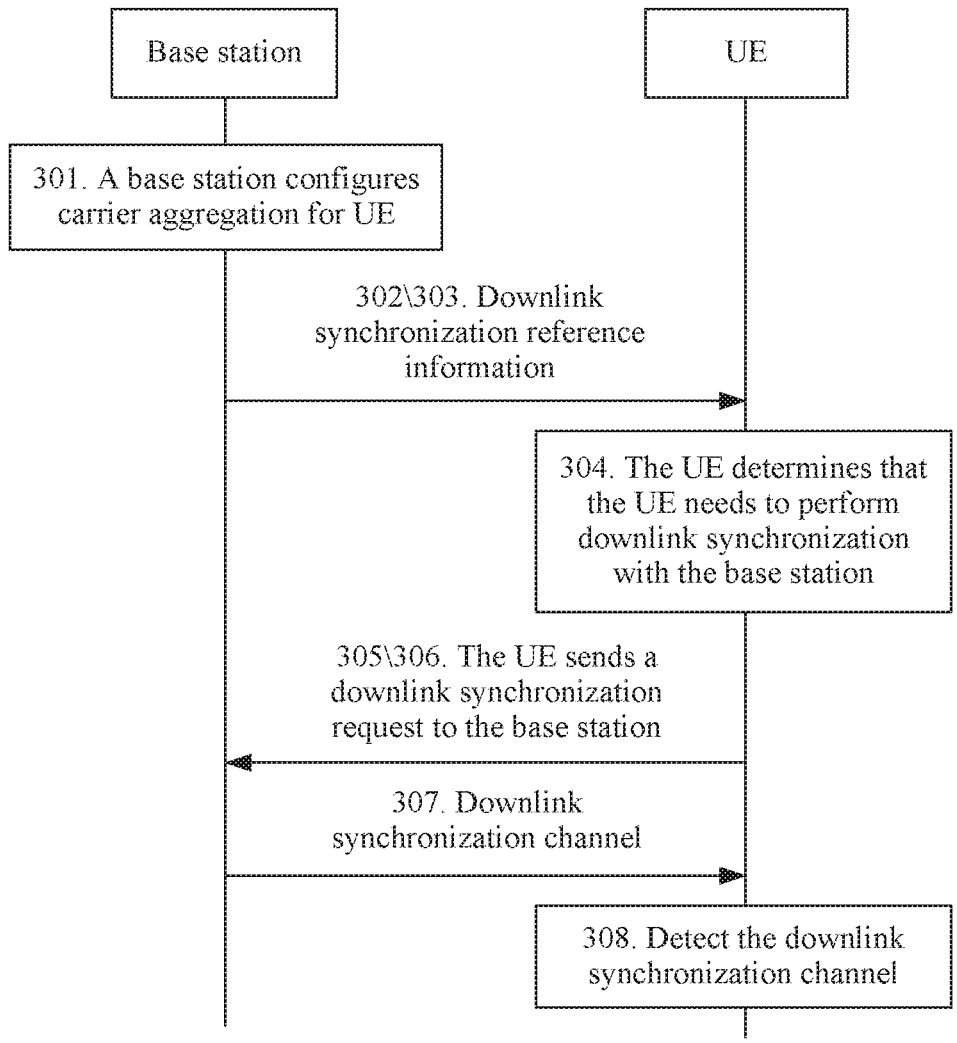
FIG. 5 is a schematic flowchart of a downlink synchronization method according to still another embodiment of the present disclosure.

Different from the embodiment shown in FIG. 4, in another implementation, when UE determines that the UE needs to perform downlink synchronization in an SCell, the UE may actively trigger a request for asking the base station to send a downlink synchronization channel in the SCell. Referring to FIG. 5, another embodiment of the present disclosure provides a downlink synchronization method. The method includes the following steps.

301. The base station configures carrier aggregation for the UE.

On an aggregated carrier, a PCell is on a carrier whose frequency domain is located on a first frequency band, and the SCell is on a carrier whose frequency domain is located on a second frequency band. The first frequency band is a relatively low frequency band, and the second frequency band is a relatively high frequency band. For a specific example, refer to description in step 201. Details are not described herein.

302. The base station sends downlink synchronization reference information to the UE by using dedicated signaling or a system message.

303. The UE receives the downlink synchronization reference information sent by the base station by using the dedicated signaling or the system message of a PCell.

304. The UE determines that the UE needs to perform downlink synchronization with the base station (has a downlink synchronization requirement).

Specifically, in step 304, the UE may determine, in at least one of the following manners or a combination of a plurality of the following manners, that the UE needs to perform downlink synchronization.

Manner 1: The UE detects a time length for receiving, in the SCell, the downlink synchronization channel sent by the base station; and when determining that no downlink synchronization channel sent by the base station is received in the SCell in a preset time length, the UE determines that the UE needs to perform downlink synchronization with the base station. An example is provided for Manner 1: After receiving the downlink synchronization channel, based on a timer or a time counter, the UE starts or restarts the timer or resets the time counter to re-timing, so as to accordingly determine the preset time length.

Manner 2: The UE determines, according to a status of detecting and receiving an SRS in the SCell, that the UE needs to perform downlink synchronization with the base station. For example, if at a preset OFDM symbol location, the UE does not detect a reference signal, or detects a time offset or a frequency offset between an OFDM symbol location of a reference signal and a pre-estimated location, the UE determines that the UE needs to perform downlink synchronization with the base station.

Manner 3: The UE determines, according to a bit error rate or a block error rate during data transmission with the base station in the SCell, that the UE needs to perform downlink synchronization with the base station. For example, if the UE determines that the bit error rate or the block error rate during data transmission with the base station in the SCell exceeds a preset threshold, the UE determines that the UE needs to perform downlink synchronization with the base station.

305. The UE sends a downlink synchronization request to the base station.

In step 305, the UE sends the downlink synchronization request to the base station in the PCell. In a preferred manner, the downlink synchronization request may indicate a beam range of sending the downlink synchronization channel by the base station in the second cell. For example, step 305 may be implemented in at least one of the following manners or a combination of a plurality of the following manners.

Manner 1: The UE sends a request message to the base station in the PCell, to instruct the base station to periodically send, by using the SCell, a beam including a downlink synchronization channel to the UE; or the UE periodically sends indication information to the base station in the PCell, to indicate whether the base station needs to send the downlink synchronization channel to the UE by using the SCell.

Manner 2: After configuring a new SCell or activating the SCell, the UE requests, by using the PCell, the base station to send the downlink synchronization channel in the SCell.

Manner 3: The UE sends, in the PCell, a request message for requesting the base station to send the downlink synchronization channel in the SCell. Time-frequency domain resources used for sending the request message by the UE may be preconfigured. For example, the UE may request, in a random access manner by using a random access preamble or a physical random access channel (PRACH) resource different from a random access purpose, the base station to send the downlink synchronization channel in the SCell.

Manner 4: If the UE is in an uplink channel synchronous state (an uplink timing advance timer (TAT) is running) in the SCell, downlink synchronization may be requested by using a downlink synchronization SRS, physical uplink control channel (PUCCH) dedicated signaling, or a media access control (MAC) control element (MAC CE).

306. The base station receives the downlink synchronization request of the UE.

That the base station determines that the UE needs to perform downlink synchronization includes: The base station determines, according to the downlink synchronization request, that the UE needs to perform downlink synchronization.

307. When the base station determines that the UE needs to perform downlink synchronization in the SCell, the base station sends, according to location information of the UE, a beam including a downlink synchronization channel to the UE in an SCell.

Before step 307, the location information of the UE may be first obtained. For example, in a TDD system, the base station may perform determining on a request message of the UE, such as a preamble or an SRS according to channel reciprocity, to obtain the location information of the UE. Certainly, the base station may also obtain the location information of the UE in another manner provided in step 205 in the foregoing embodiment.

After sending the downlink synchronization request, the UE may receive the downlink synchronization channel in the SCell according to a preset or preconfigured time window. Because different UEs have different moving speeds, different wireless conditions, or different UE capabilities, the different UEs may perform downlink synchronization with the base station in the SCell at different time. The base station may configure different trigger periods for the different UEs, so that the different UEs detect whether the UEs need to perform synchronization in the SCell, and request the base station to send the downlink synchronization channel to the UEs at different moments. As shown in FIG. 5, it may be configured that among beams sent by the base station in a period of time, only a beam that points to UE1 includes a downlink synchronization channel.

308. The UE detects, according to the downlink synchronization reference information, a downlink synchronization channel of the SCell in the beam sent by the base station.

After sending a downlink synchronization request message to the base station, the UE waits for the downlink synchronization channel sent by the base station. The UE may wait for the downlink synchronization channel according to a preset time window (for example, according to a timer or a time counter). If the UE receives no downlink synchronization channel in the preset time window, the UE may resend the downlink synchronization request message, until a maximum quantity of sending times is reached. If the UE detects no downlink synchronization channel in the SCell all the time, the UE reports error indication information or resends the downlink synchronization request message to the base station, searches another cell again, and reports a measurement result to the base station. The UE may trigger detection on a downlink synchronization channel of a neighboring high frequency cell and measurement on the high frequency cell according to a measurement result of a neighboring low frequency cell, and try to request the downlink synchronization channel in the measured high frequency cell. The UE may obtain time window information according to an identifier of a beam in which the UE is currently located and information about a time offset between a downlink synchronization channel of the beam and a downlink synchronization channel of the PCell.

After step 308, if the UE successfully detects the downlink synchronization channel, the UE may send indication information to the base station at a preconfigured time-frequency resource location, to notify the base station that the UE successfully performs downlink synchronization in the SCell. For example, a preamble different from a random access purpose and a synchronization request purpose may be used, or an SRS starts to be sent. A time-frequency domain resource and an encoding mode of the SRS may be different from a time-frequency domain resource and an encoding mode of an SRS used for a downlink synchronization request purpose of the UE.

According to the downlink synchronization method provided in this embodiment of the present disclosure, the base station sends the downlink synchronization reference information to the UE by using the dedicated signaling or the system message, and sends, in the second cell according to the location information of the UE, the beam including a downlink synchronization channel to the UE, so that the UE detects, according to the received downlink synchronization reference information, the downlink synchronization channel in the beam sent by the base station. The downlink synchronization reference information can be used to instruct the UE to perform downlink synchronization in the second cell by referring to the downlink synchronization channel of the first cell, so that downlink synchronization is implemented in a cellular communications system through beamforming. In addition, in this embodiment, when determining that the UE needs to perform downlink synchronization in the second cell, the UE may actively trigger a request for asking the base station to send the downlink synchronization channel in the second cell.

In this embodiment, a frequency domain resource of a downlink synchronization channel of the SCell may be UE-specific. That is, the base station configures different frequency domain resources for different UEs. Specifically, the base station may configure, for the UE, information about a frequency range that is in the SCell and that is occupied by the downlink synchronization channel. When scheduling another UE that does not need to perform synchronization in a same beam, the base station may be prevented from using a time-frequency domain resource occupied by the downlink synchronization channel.

Figure 6:
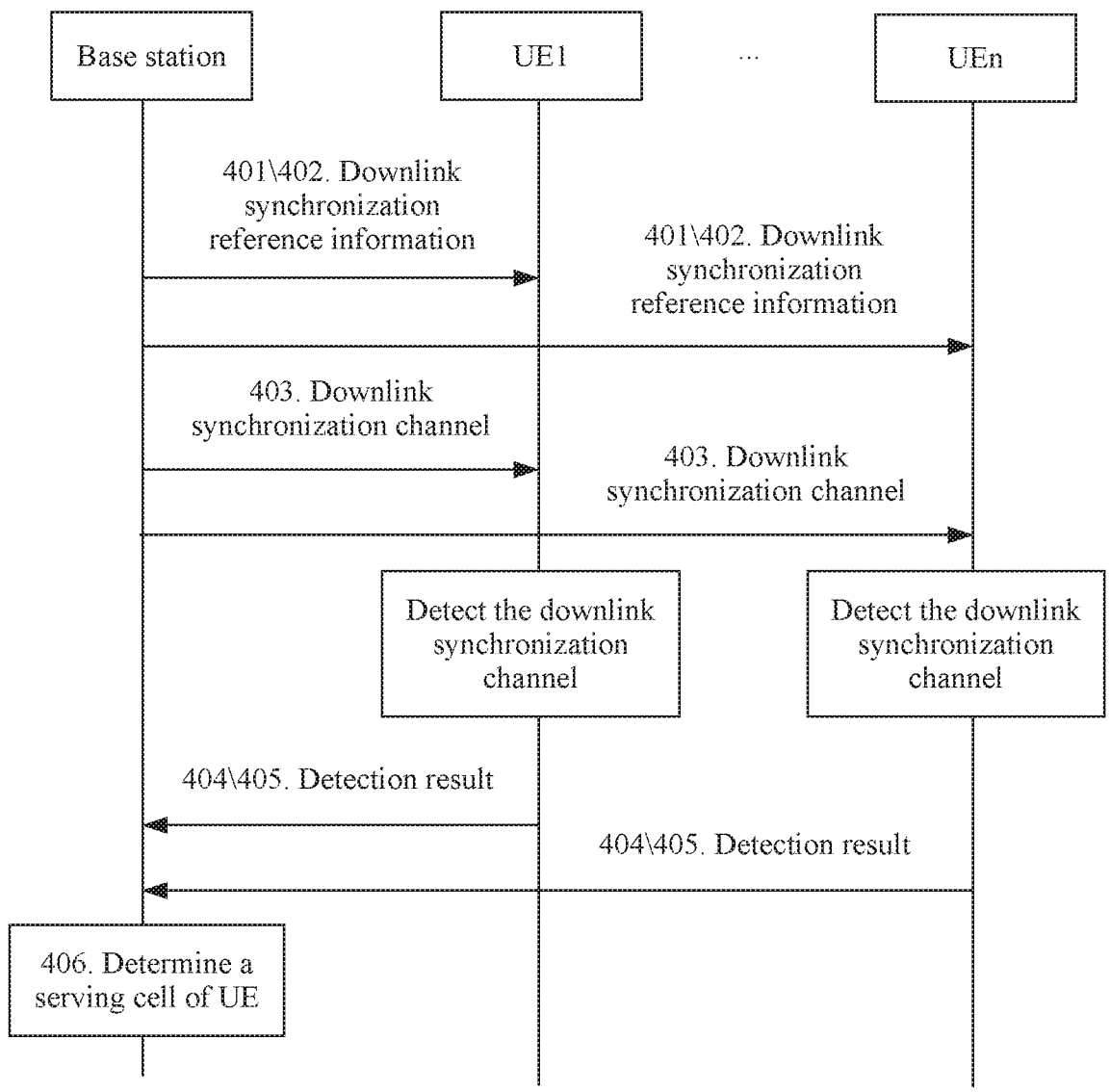
FIG. 6 is a schematic flowchart of a downlink synchronization method according to yet another embodiment of the present disclosure.

In addition, the frequency domain resource of the downlink synchronization channel of the SCell may be cell-specific. That is, all UEs in the SCell have the same frequency domain resource. However, a time domain resource is determined by an event or a period. All UEs in the beam including a downlink synchronization channel may receive the downlink synchronization channel, to obtain information about downlink synchronization in the SCell. That is, the base station may send the same downlink synchronization channel to all the UEs in the SCell. In this case, the base station determines, according to detection results that are of the downlink synchronization channel and that are fed back by all the UEs, whether to configure the corresponding SCell as a serving cell of corresponding UE. Referring to FIG. 6, another embodiment of the present disclosure provides a downlink synchronization method. The method includes the following steps.

401. A base station sends downlink synchronization reference information to all UEs in an SCell by using dedicated signaling or a system message.

402. All the UEs in the SCell receive the downlink synchronization reference information sent by the base station by using the dedicated signaling or the system message.

403. The base station sends, according to location information of each UE in the SCell, a beam including a downlink synchronization channel to the UE in the SCell.

Before step 403, the location information of all the UEs may be first obtained. The base station may traverse all beams within a sector area of the SCell to obtain the location information of all the UEs. For example, the base station scans, through beam irradiation, an entire area covered by the SCell. The beam is used to carry an indication or signaling for obtaining the location information of each UE. For a manner of obtaining location information of one UE according to the indication or the signaling carried in the beam, refer to the manner of obtaining the location information of the UE provided in each of the foregoing embodiments. In this way, sending the beam including a downlink synchronization channel in a direction of a beam including UE is implemented in step 403.

404. The UE detects, according to the downlink synchronization reference information, a downlink synchronization channel of the SCell in the beam sent by the base station, and reports a detection result of the downlink synchronization channel to the base station.

When sending the downlink synchronization channel, the base station accordingly skips a time location occupied by a skipped direction of a beam that does not include UE, or the base station readjusts, according to an actual quantity of beams, a time location that needs to be occupied by each beam. Information about the quantity of beams may be broadcast by using a PCell, so that the UE can determine, according to the quantity of beams, information about a time offset between the UE and a downlink synchronization channel of the PCell, and an identifier of a beam in which the UE is located, a specific OFDM symbol location at which the UE needs to receive the synchronization channel. For example, when the quantity of beams changes, a mapping relationship among a specific beam, a subframe index in the PCell, and a symbol location of the subframe index may change, or the UE may obtain time window information, and receive the downlink synchronization channel in a time window range.

405. The base station receives the detection result that is of the downlink synchronization channel of the SCell and that is reported by the UE.

406. The base station determines, according to the detection result, whether to configure the SCell as a serving cell of the UE.

In this solution, the base station can determine, according to the detection result, whether to configure the second cell as the serving cell of the UE. Therefore, the base station may send a same downlink synchronization reference signal to all UEs in the second cell, and determine, according to a detection result that is of the downlink synchronization channel of the second cell and that is reported by each UE, whether to configure the second cell as a serving cell of the UE. A unified downlink synchronization reference signal is designed for all the UEs, so that signaling design overheads are reduced.

Figure 7:
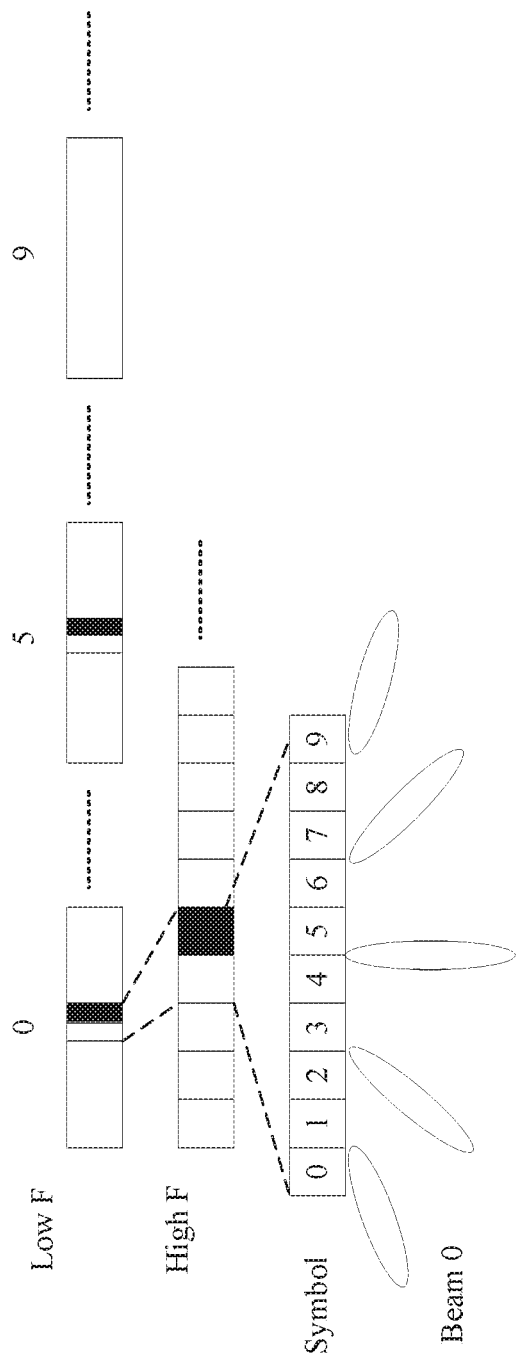
FIG. 7 is a schematic structural diagram of a frame structure according to an embodiment of the present disclosure.
Figure 8:
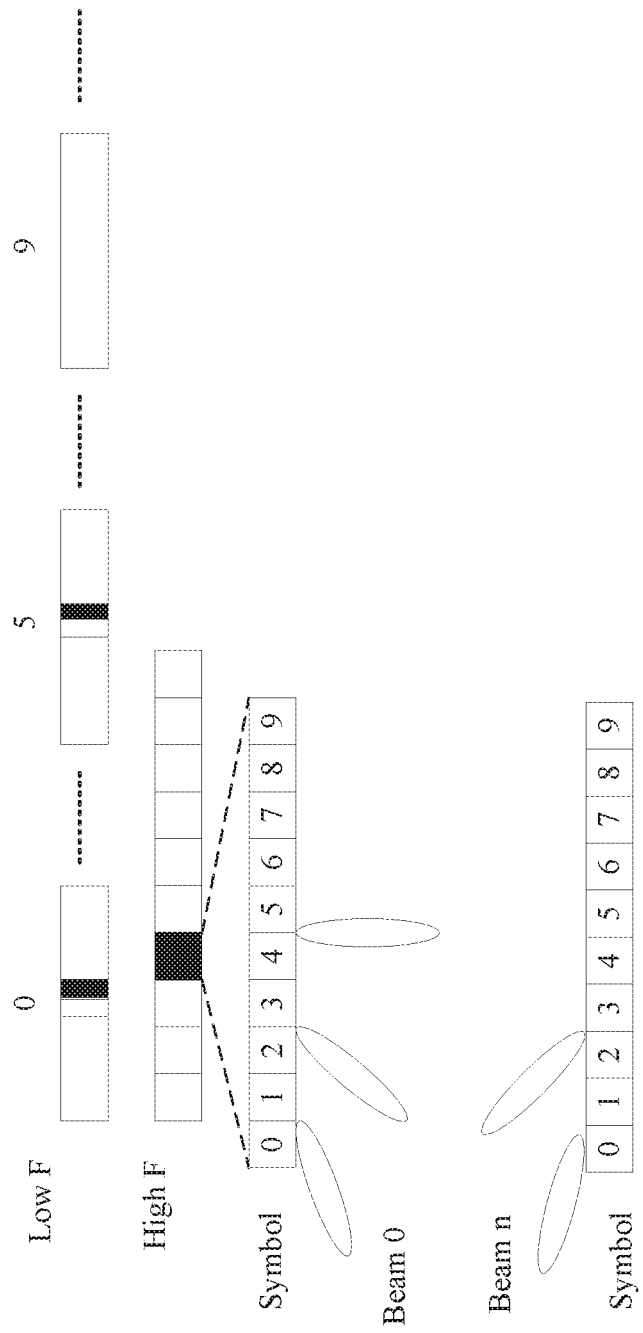
FIG. 8 is a schematic structural diagram of a frame structure according to another embodiment of the present disclosure.
Figure 9:
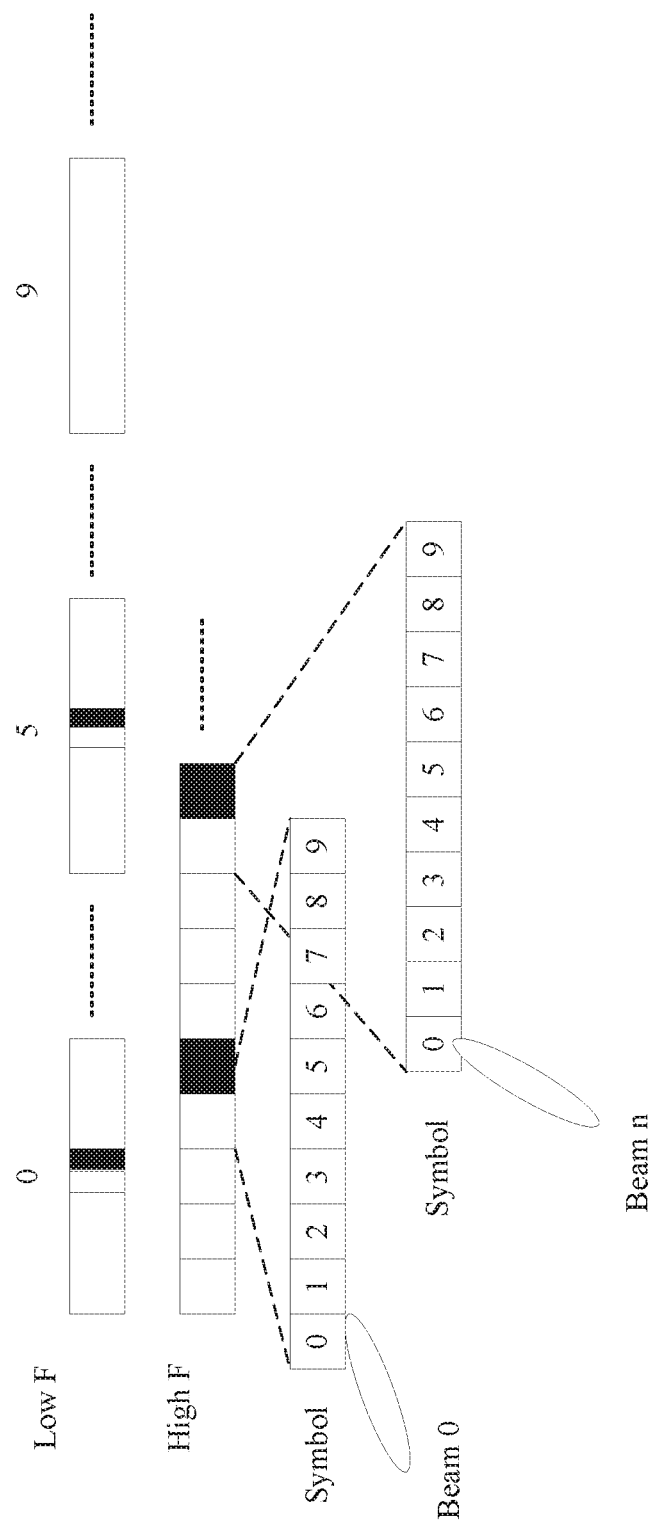
FIG. 9 is a schematic structural diagram of a frame structure according to still another embodiment of the present disclosure.

For the downlink synchronization method provided in the foregoing embodiments, an embodiment of the present disclosure provides frame structures shown in FIG. 7, FIG. 8, and FIG. 9, to describe a time offset between a time location of a beam of a downlink synchronization channel of an SCell and a time location of a beam of a downlink synchronization channel of a PCell. As shown in FIG. 7, FIG. 8, and FIG. 9, a low frequency (Low F) indicates a structure of a subframe sent in the PCell, and a high frequency (High F) indicates a structure of a subframe sent in the SCell. A fixed time offset exists between a beam 0 including a downlink synchronization channel in the SCell and a downlink synchronization channel of the PCell. Correspondingly, a fixed time offset also exists between a beam 1, . . . , or a beam n in the SCell and the downlink synchronization channel of the PCell. All beams are corresponding to different time offsets. For example, the beam 0 shown in FIG. 7 is corresponding to a symbol 0 (symbol 0) of a subframe 0 in the PCell, and a beam 8 is corresponding to a symbol 2 (not shown in the figure) of a subframe 1. If a fixed mapping relationship exists between a time offset and a beam ID, beam ID information does not need to be scrambled on the downlink synchronization channel of the SCell, and the UE may obtain the beam ID information according to the time offset. Alternatively, if a fixed mapping relationship does not exist between a time offset and a beam ID, the base station may scramble the beam ID by using the synchronization channel, so that the UE determines, according to the beam ID, a current symbol location (which may be updated) of the UE. The base station may determine for the SCell a downlink synchronization channel period greater than a downlink synchronization channel period of the PCell, so as to reduce synchronization overheads.

That the base station sends the downlink synchronization channel in the SCell to each UE according to location information of the UE in the SCell in the foregoing embodiments may be specifically as follows: The base station sends, at any OFDM symbol location in a subframe in the SCell according to the location information of the UE, a beam including a downlink synchronization channel to the UE.

Each OFDM symbol location is corresponding to one beam. All UEs in a coverage area of one beam may receive a downlink synchronization channel included in the beam. Two different beams are two beams whose maximum radiation directions do not overlap. It may be understood that, when one UE in the SCell performs downlink synchronization, a downlink synchronization channel for the UE may be sent in a beam that is corresponding to location information of the UE and that is at any OFDM symbol location in a subframe; or when all UEs in the SCell perform downlink synchronization, a same downlink synchronization channel is sent to all the UEs, and the downlink synchronization channel of each UE may be sent in a beam that is corresponding to location information of the UE and that is at an OFDM symbol location in a subframe.

As shown in FIG. 7, different beams including a downlink synchronization channel are separately sent at different OFDM symbol locations in one subframe in the SCell. These beams have different directions, so that a plurality of UE locations can be covered. If a total quantity of beams is greater than a maximum quantity of beams that can be sent in one subframe (in consideration of a quantity of symbols and a beam switching time that are occupied by a synchronization channel beam), different beams may be sent in a plurality of subframes. A PSS and an SSS may be redesigned as an evolved synchronization signal (eSS) in one symbol, to simplify a synchronization process.

Further, each OFDM symbol includes beams in at least two directions. All the beams in the at least two directions use different radio frequency chains RF chains. For example, as shown in FIG. 8, different beams including a downlink synchronization channel are separately sent at different OFDM symbol locations in one subframe in the SCell. However, a plurality of different beams may be simultaneously sent at a same OFDM symbol location by using a plurality of RF chains. As shown in FIG. 8, a beam 0 and a beam n are simultaneously sent at a location of a symbol 0 by respectively using one RF chain. Therefore, more beams may be sent by using fewer OFDM symbols, so as to cover more UEs more quickly. In this case, a same time offset between a time location of a downlink synchronization channel of the SCell and a time location of a downlink synchronization channel of the PCell may be corresponding to a plurality of beam IDs.

Optionally, step 403 may be specifically as follows: The base station sends, at a fixed OFDM symbol location in any subframe in the SCell according to location information of the UE, different beams including a downlink synchronization channel to the UE. It may be understood that, when one UE in the SCell performs downlink synchronization, a downlink synchronization channel for the UE may be sent in a beam that is corresponding to location information of the UE and that is at a fixed OFDM symbol location in any subframe; or when all UEs in the SCell perform downlink synchronization, a same downlink synchronization channel is sent to all the UEs, and downlink synchronization channels of all the UEs may be separately sent in beams that are corresponding to location information of all the UEs and that are at fixed OFDM symbol locations in different subframes. For example, as shown in FIG. 9, one beam including a synchronization channel is sent at a specified OFDM symbol location in each subframe in the SCell. Therefore, a plurality of different beams need to be sent in a plurality of subframes (a beam 0, a beam 1, a beam 2, . . . ). Further, each OFDM symbol includes beams in at least two directions. All the beams in the at least two directions use different radio frequency chains RF chains. This solution is similar to that in FIG. 8. Details are not described herein.

Figure 10:
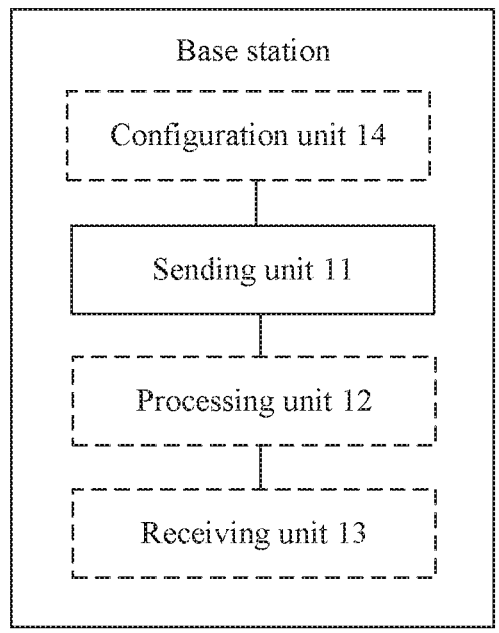
FIG. 10 is a schematic structural diagram of a base station according to an embodiment of the present disclosure.

Referring to FIG. 10, an embodiment of the present disclosure provides an apparatus, configured to perform the downlink synchronization method provided in the foregoing embodiments. The apparatus may be a base station, and may include:

a sending unit 11, configured to send downlink synchronization reference information to UE by using dedicated signaling or a system message, where the downlink synchronization reference information is used to instruct the UE to perform downlink synchronization in a second cell by referring to a downlink synchronization channel of a first cell.

The sending unit 11 is further configured to send, in the second cell according to location information of the UE, a beam including a downlink synchronization channel to the UE, where the first cell and the second cell include an overlapped coverage area.

According to the downlink synchronization apparatus provided in this solution, the base station sends the downlink synchronization reference information to the UE by using the dedicated signaling or the system message, and sends, in the second cell according to the location information of the UE, the beam including a downlink synchronization channel to the UE, so that the UE detects, according to the received downlink synchronization reference information, the downlink synchronization channel in the beam sent by the base station. The downlink synchronization reference information can be used to instruct the UE to perform downlink synchronization in the second cell by referring to the downlink synchronization channel of the first cell, so that downlink synchronization is implemented in a cellular communications system through beamforming.

Optionally, referring to FIG. 10, the base station further includes:

a processing unit 12, configured to determine that the UE needs to perform downlink synchronization in the second cell.

Specifically, the processing unit 12 is configured to detect a time length for sending the downlink synchronization channel in the second cell to the UE; and when determining that no downlink synchronization channel is sent in the second cell to the UE in a preset time length, the processing unit 12 determines that the UE needs to perform downlink synchronization; or the processing unit 12 is configured to determine, according to a status of detecting and receiving a sounding reference signal SRS of the UE in the second cell, that the UE needs to perform downlink synchronization; or the processing unit 12 is configured to determine, according to a bit error rate or a block error rate during data transmission in the second cell with the UE, that the UE needs to perform downlink synchronization.

In this solution, the base station may actively trigger sending of the downlink synchronization channel when determining that the UE needs to perform downlink synchronization in the second cell.

Alternatively, the base station further includes a receiving unit 13, configured to receive a downlink synchronization request of the UE.

The processing unit 12 is configured to determine, by the base station according to the downlink synchronization request, that the UE needs to perform downlink synchronization.

In this embodiment, when determining that the UE needs to perform downlink synchronization in the second cell, the UE may actively trigger a request for asking the base station to send the downlink synchronization channel in the second cell.

Referring to FIG. 10, the base station further includes:

a configuration unit 14, configured to configure carrier aggregation for the UE, where on an aggregated carrier, the first cell is on a carrier whose frequency domain is located on a first frequency band, the second cell is on a carrier whose frequency domain is located on a second frequency band, the first frequency band is a relatively low frequency band, and the second frequency band is a relatively high frequency band.

Optionally, the receiving unit 13 is configured to receive a detection result that is of a downlink synchronization channel of the second cell and that is reported by the UE.

The processing unit 12 is configured to determine, according to the detection result received by the receiving unit, whether to configure the second cell as a serving cell of the UE.

In this solution, the base station can determine, according to the detection result, whether to configure the second cell as the serving cell of the UE. Therefore, the base station may send a same downlink synchronization reference signal to all UEs in the second cell, and determine, according to a detection result that is of the downlink synchronization channel of the second cell and that is reported by each UE, whether to configure the second cell as a serving cell of the UE. A unified downlink synchronization reference signal is designed for all the UEs, so that signaling design overheads are reduced.

Optionally, the sending unit 11 is specifically configured to send, at any OFDM symbol location in a subframe in the second cell according to the location information, the beam including a downlink synchronization channel to the UE.

Optionally, the sending unit 11 is specifically configured to send, at a fixed OFDM symbol location in any subframe in the second cell according to the location information, different beams including a downlink synchronization channel to the UE.

Optionally, each OFDM symbol includes beams in at least two directions. All the beams in the at least two directions use different radio frequency chains RF chains.

In addition, a fixed time offset is used between a time location of a beam of the downlink synchronization channel of the second cell and a time location of a beam of the downlink synchronization channel of the first cell. The downlink synchronization reference information may further include but is not limited to at least one of the following information: a mapping relationship between the time offset and a beam ID of the downlink synchronization channel of the second cell, a frequency band of the second cell, bandwidth of the second cell, a PCI of the second cell, a frequency range in which the downlink synchronization channel of the second cell is located, a quantity of beams of the second cell, or a beam width of the second cell.

It should be noted that the sending unit 11 in this embodiment may be an interface circuit that has a sending function on the base station, such as a transmitter or an information sending interface. The receiving unit 13 may be an interface circuit that has a receiving function on the base station, such as a receiver or an information receiving interface. The processing unit 12 and the configuration unit 14 may be separately disposed processors, or may be integrated into one processor of the base station for implementation. In addition, the processing unit 12 and the configuration unit 14 may be stored in a memory of the base station in a form of program code. Functions of the processing unit 12 and the configuration unit 14 are invoked and executed by a processor of the base station. The processor described herein may be a central processing unit (CPU), or an application-specific integrated circuit (ASIC), or may be one or more integrated circuits configured to implement this embodiment of the present disclosure.

Figure 11:
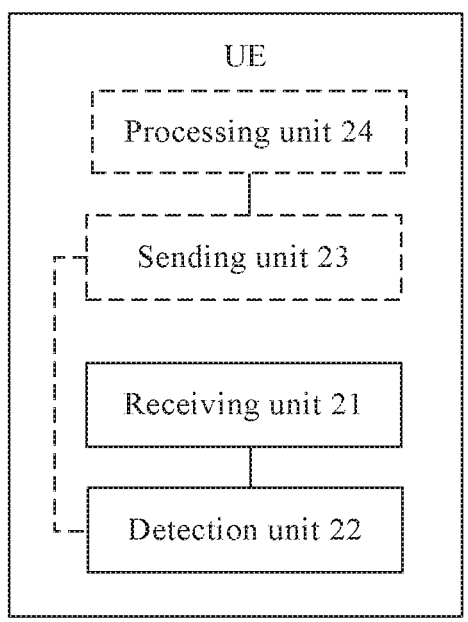
FIG. 11 is a schematic structural diagram of UE according to an embodiment of the present disclosure.

Referring to FIG. 11, an embodiment of the present disclosure provides an apparatus. The apparatus may be UE, and includes:

a receiving unit 21, configured to receive downlink synchronization reference information sent by a base station by using dedicated signaling or a system message, where the downlink synchronization reference information is used to instruct the UE to perform downlink synchronization in a second cell by referring to a downlink synchronization channel of a first cell; and a detection unit 22, configured to detect, according to the downlink synchronization reference information received by the receiving unit 21, a downlink synchronization channel of the second cell in a beam sent by the base station, where the first cell and the second cell include an overlapped coverage area.

In this solution, the base station sends the downlink synchronization reference information to the UE by using the dedicated signaling or the system message, and sends, in the second cell according to location information of the UE, a beam including a downlink synchronization channel to the UE, so that the UE detects the downlink synchronization channel according to the received downlink synchronization reference information. The downlink synchronization reference information can be used to instruct the UE to perform downlink synchronization in the second cell by referring to the downlink synchronization channel of the first cell, so that downlink synchronization is implemented in a cellular communications system through beamforming.

Optionally, referring to FIG. 11, the UE further includes:

a sending unit 23, configured to report a detection result of the downlink synchronization channel of the second cell to the base station.

Optionally, the UE further includes:

a processing unit 24, configured to determine that the UE needs to perform downlink synchronization with the base station; and a sending unit 23, configured to send a downlink synchronization request to the base station.

In this solution, the base station may actively trigger sending of the downlink synchronization channel when determining that the UE needs to perform downlink synchronization in the second cell.

Optionally, the processing unit 24 is specifically configured to detect a time length for receiving, in the second cell, the downlink synchronization channel sent by the base station; and when determining that no downlink synchronization channel sent by the base station is received in the second cell in a preset time length, the processing unit 24 determines that the UE needs to perform downlink synchronization with the base station; or the processing unit 24 determines, according to a status of detecting and receiving an SRS in the second cell, that the UE needs to perform downlink synchronization with the base station; or the processing unit 24 determines, according to a bit error rate or a block error rate during data transmission in the second cell with the base station, that the UE needs to perform downlink synchronization with the base station.

In this solution, when determining that the UE needs to perform downlink synchronization in the second cell, the UE may actively trigger a request for asking the base station to send the downlink synchronization channel in the second cell.

Optionally, the UE further includes:

a sending unit 23, configured to report a detection result of the downlink synchronization channel to the base station.

Optionally, the detection unit 22 is specifically configured to detect, according to information about the downlink synchronization channel of the first cell, the downlink synchronization channel of the second cell in the beam sent by the base station.

It should be noted that the sending unit 23 in this embodiment may be an interface circuit that has a sending function on the UE, such as a transmitter or an information sending interface. The receiving unit 21 may be an interface circuit that has a receiving function on the UE, such as a receiver or an information receiving interface. The detection unit 22 and the processing unit 24 may be separately disposed processors, or may be integrated into one processor of the UE for implementation. In addition, the detection unit 22 and the processing unit 24 may be stored in a memory of the UE in a form of program code. Functions of the detection unit 22 and the processing unit 24 are invoked and executed by a processor of the UE. The processor described herein may be a central processing unit (CPU), or an application-specific integrated circuit (ASIC), or may be one or more integrated circuits configured to implement this embodiment of the present disclosure.

Figure 12:
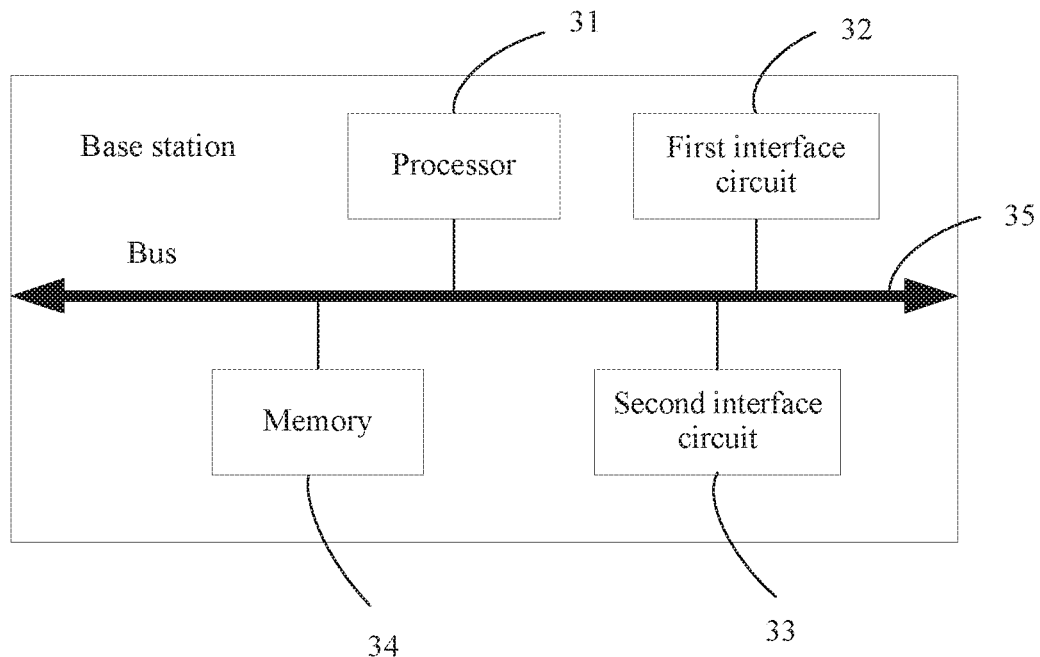
FIG. 12 is a schematic structural diagram of a base station according to another embodiment of the present disclosure.

Referring to FIG. 12, an embodiment of the present disclosure provides an apparatus, configured to perform the foregoing downlink synchronization method. The apparatus may be a base station, and may include a processor 31, a first interface circuit 32, a second interface circuit 33, a memory 34, and a bus 35. The processor 31, the first interface circuit 32, the second interface circuit 33, and the memory 34 are connected to each other and communicate with each other by using the bus 35.

It should be noted that the processor 31 herein may be one processor, or may be a general term of a plurality of processing elements. For example, the processor may be a central processing unit (CPU), or may be an application-specific integrated circuit (ASIC), or may be one or more integrated circuits configured to implement this embodiment of the present disclosure, such as one or more microprocessors (e.g., a digital signal processor (DSP)), or one or more field programmable gate arrays (FPGA).

The memory 34 may be one storage apparatus or may be a general term of a plurality of storage elements, and is configured to store executable program code or a parameter, data, and the like that are required for running an access network management device. In addition, the memory 34 may include a random access memory (RAM), or may include a nonvolatile memory (NVRAM), such as a magnetic disk storage or a flash (Flash) memory.

The bus 35 may be an industry standard architecture (ISA) bus, a peripheral component interconnect (PCI) bus, an extended industry standard architecture (EISA) bus, or the like. The bus 35 may be classified into an address bus, a data bus, a control bus, and the like. For ease of representation, only one bold line is used in FIG. 12, but it does not indicate that there is only one bus or one type of bus.

The processor 31 is configured to execute a program in the memory, to perform the method provided in the foregoing method embodiment with reference to the first interface circuit 32 and the second interface circuit 33.

Specifically, the processor 31 is configured to execute the program in the memory to execute functions of the processing unit and the configuration unit in the base station in the foregoing embodiment.

The first interface circuit 32 is configured to execute a function of the sending unit in the base station in the foregoing embodiment.

The second interface circuit 33 is configured to execute a function of the receiving unit in the base station in the foregoing embodiment.

Figure 13:
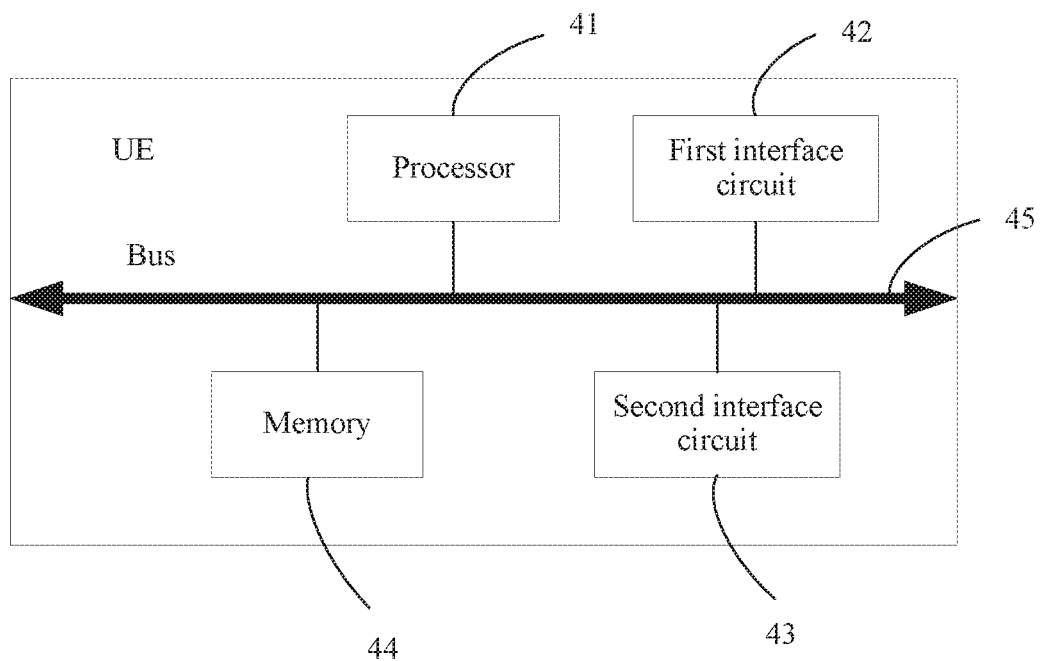
FIG. 13 is a schematic structural diagram of UE according to another embodiment of the present disclosure.

Referring to FIG. 13, an embodiment of the present disclosure provides an apparatus, configured to perform the foregoing downlink synchronization method. The apparatus may be UE, and may include a processor 41, a first interface circuit 42, a second interface circuit 43, a memory 44, and a bus 45. The processor 41, the first interface circuit 42, the second interface circuit 43, and the memory 44 are connected to each other and communicate with each other by using the bus 45.

It should be noted that the processor 41 herein may be one processor, or may be a general term of a plurality of processing elements. For example, the processor may be a central processing unit CPU, or may be an application-specific integrated circuit ASIC, or may be one or more integrated circuits configured to implement this embodiment of the present disclosure, such as one or more microprocessors (e.g., a digital signal processor (DSP)), or one or more field programmable gate arrays (FPGA).

The memory 44 may be one storage apparatus or may be a general term of a plurality of storage elements, and is configured to store executable program code or a parameter, data, and the like that are required for running an access network management device. In addition, the memory 44 may include a random access memory (RAM), or may include a nonvolatile memory (NVRAM), such as a magnetic disk storage or a flash (Flash) memory.

The bus 45 may be an industry standard architecture (ISA) bus, a peripheral component interconnect (PCI) bus, an extended industry standard architecture (EISA) bus, or the like. The bus 45 may be classified into an address bus, a data bus, a control bus, and the like. For ease of representation, only one bold line is used in FIG. 13, but it does not indicate that there is only one bus or one type of bus.

The processor 41 is configured to execute a program in the memory, to perform the method provided in the foregoing method embodiment with reference to the first interface circuit 42 and the second interface circuit 43.

Specifically, the processor 41 is configured to execute the program in the memory to execute functions of the detection unit and the processing unit in the UE in the foregoing embodiment.

The first interface circuit 42 is configured to execute a function of the receiving unit in the UE in the foregoing embodiment.

The second interface circuit 43 is configured to execute a function of the sending unit in the UE in the foregoing embodiment.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communications method, comprising:
   configuring, by a first base station, carrier aggregation or dual connection on a first cell and a second cell for a terminal;
   sending, by the first base station, downlink synchronization reference information to the terminal by using dedicated signaling or a system message, the downlink synchronization reference information for instructing the terminal to perform downlink synchronization in the second cell by applying a relationship between a time domain source of a second downlink synchronization channel of the second cell and a time domain source of a first downlink synchronization channel of the first cell, wherein the second cell is on a second carrier and the first cell is on a first carrier, wherein a second downlink synchronization channel of the second cell is detected by the terminal according to the downlink synchronization reference information.

2. The method according to claim 1, further comprising:
   sending, by a second base station and in the second cell, the second downlink synchronization channel to the terminal, wherein the second base station is the first base station or a base station other than the first base station.

3. The method according to claim 2, wherein the method further comprises:
   determining, by the first base station, that the terminal needs to perform downlink synchronization in the second cell.

4. The method according to claim 2, wherein after sending, by the second base station in the second cell, the second downlink synchronization channel to the terminal, the method further comprises:
   receiving, by the first base station, a detection result of the second downlink synchronization channel of the second cell that is reported from the terminal; and
   determining, by the first base station, according to the detection result, whether to configure the second cell as a serving cell of the terminal.

5. The method according to claim 2, wherein sending, by the second base station in the second cell, the second downlink synchronization channel to the terminal comprises:
   sending, by the second base station at any orthogonal frequency division multiplexing (OFDM) symbol location in a subframe in the second cell, the second downlink synchronization channel to the terminal.

6. The method according to claim 5, wherein each OFDM symbol comprises beams in at least two directions, and all the beams in the at least two directions use different radio frequency (RF) chains.

7. The method according to claim 2, wherein sending, by the second base station in the second cell, the second downlink synchronization channel to the terminal comprises:
sending, by the second base station at a fixed orthogonal frequency division multiplexing (OFDM) symbol location in a subframe in the second cell, the second downlink synchronization channel to the terminal.

8. The method according to claim 1, wherein the second cell is a neighbor cell of the first cell.

9. A communications method, comprising:
receiving, by a terminal, downlink synchronization reference information from a base station by using dedicated signaling or a system message, wherein the downlink synchronization reference information instructs the terminal to perform downlink synchronization in a second cell by applying a relationship between a time domain source of a second downlink synchronization channel of the second cell and a time domain source of a first downlink synchronization channel of the first cell, wherein the second cell is on a second carrier and the first cell is on a first carrier; and
detecting, by the terminal according to the downlink synchronization reference information, a second downlink synchronization channel of the second cell.

10. The method according to claim 9, wherein after detecting, by the terminal according to the downlink synchronization reference information, the second downlink synchronization channel of the second cell, the method further comprises:
reporting, by the terminal, a detection result of the second downlink synchronization channel of the second cell.

11. The method according to claim 9, wherein detecting, by the terminal according to the downlink synchronization reference information, the second downlink synchronization channel of the second cell comprises:
detecting, by the terminal according to information about the first downlink synchronization channel of the first cell, the second downlink synchronization channel of the second cell.

12. The method according to claim 9, further comprising:
receiving, by the terminal, a configuration about carrier aggregation or dual connection on the first cell and the second cell for the terminal.

13. The method according to claim 9, wherein the second cell is a neighbor cell of the first cell.

14. An apparatus, comprising:
a receiving circuit to receive downlink synchronization reference information from a base station by using dedicated signaling or a system message, wherein the downlink synchronization reference information instructs the apparatus to perform downlink synchronization in a second cell by applying a relationship between a time domain source of a second downlink synchronization channel of the second cell and a time domain source of a first downlink synchronization channel of the first cell, wherein second cell is on a second carrier and the first cell is on a first carrier; and
a processor to detect, according to the downlink synchronization reference information received by the receiving circuit, a second downlink synchronization channel of the second cell.

15. The apparatus according to claim 14, further comprising:
a transmitting circuit to report a detection result of the second downlink synchronization channel of the second cell.

16. The apparatus according to claim 14, wherein the processor is to detect, according to information about the first downlink synchronization channel of the first cell, the second downlink synchronization channel of the second cell.

17. The apparatus according to claim 14, wherein the receiving circuit is further configured to receive a configuration about carrier aggregation or dual connection on the first cell and the second cell for the terminal.

18. The apparatus according to claim 14, wherein the second cell is a neighbor cell of the first cell.

* * * * *

UNITED STATES PATENT AND TRADEMARK OFFICE
CERTIFICATE OF CORRECTION

PATENT NO. : 11,102,744 B2
APPLICATION NO. : 16/843781
DATED : August 24, 2021
INVENTOR(S) : Jian Zhang et al.

Page 1 of 1

It is certified that error appears in the above-identified patent and that said Letters Patent is hereby corrected as shown below:

On the Title Page

Below the listing of inventors, item (73), please insert the Assignee as --HUAWEI TECHNOLOGIES CO., LTD., Guangdong, (CN)--.

In the Claims

In Claim 14, Column 32, Line 21, delete "wherein second cell" and insert --wherein the second cell--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*